Feb. 26, 1957 H. R. WARREN 2,783,344

DIELECTRIC HEATING SYSTEMS AND APPLICATORS

Filed March 26, 1954 12 Sheets-Sheet 1

INVENTOR.
HENRY R. WARREN

BY

Woodcock and Phelan
ATTORNEYS

*INVENTOR.*
HENRY R. WARREN

*BY*

Woodcock and Phelan
ATTORNEYS

Feb. 26, 1957 H. R. WARREN 2,783,344

DIELECTRIC HEATING SYSTEMS AND APPLICATORS

Filed March 26, 1954 12 Sheets-Sheet 3

INVENTOR.
HENRY R. WARREN

BY

Woodcock and Phelan
ATTORNEYS

Feb. 26, 1957 H. R. WARREN 2,783,344

DIELECTRIC HEATING SYSTEMS AND APPLICATORS

Filed March 26, 1954 12 Sheets-Sheet 4

INVENTOR.
HENRY R. WARREN

BY

Woodcock and Phelan
ATTORNEYS

DIELECTRIC HEATING SYSTEMS AND APPLICATORS

Filed March 26, 1954 12 Sheets-Sheet 5

INVENTOR.
HENRY R. WARREN
BY
Woodcock and Phelan
ATTORNEYS

INVENTOR.
HENRY R. WARREN
BY
Woodcock and Phelan
ATTORNEYS

*INVENTOR.*
HENRY R. WARREN
*BY*
Woodcock and Phelan
ATTORNEYS

Feb. 26, 1957 H. R. WARREN 2,783,344

DIELECTRIC HEATING SYSTEMS AND APPLICATORS

Filed March 26, 1954 12 Sheets-Sheet 8

INVENTOR.
HENRY R. WARREN
BY
Woodcock and Phelan
ATTORNEYS

Feb. 26, 1957 H. R. WARREN 2,783,344

DIELECTRIC HEATING SYSTEMS AND APPLICATORS

Filed March 26, 1954 12 Sheets-Sheet 9

INVENTOR.
HENRY R. WARREN

BY Woodcock and Phelan
ATTORNEYS

Feb. 26, 1957 H. R. WARREN 2,783,344

DIELECTRIC HEATING SYSTEMS AND APPLICATORS

Filed March 26, 1954 12 Sheets-Sheet 10

INVENTOR.
HENRY R. WARREN
BY
Woodcock and Phelan
ATTORNEYS

Feb. 26, 1957 H. R. WARREN 2,783,344

DIELECTRIC HEATING SYSTEMS AND APPLICATORS

Filed March 26, 1954 12 Sheets-Sheet 11

INVENTOR.
HENRY R. WARREN
BY
Woodard and Phelan
ATTORNEYS

INVENTOR.
HENRY R. WARREN
BY
Woodcock and Phelan
ATTORNEYS

United States Patent Office 2,783,344

Patented Feb. 26, 1957

2,783,344

DIELECTRIC HEATING SYSTEMS AND APPLICATORS

Henry R. Warren, Columbus, Ind., assignor to National Cylinder Gas Company, Chicago, Ill., a corporation of Delaware Application March 26, 1954, Serial No. 419,633

44 Claims. (Cl. 219—10.55)

This invention relates to high-frequency generating systems and apparatus particularly suited for heating, or both heating and pressing, a dielectric load.

In accordance with one aspect of the invention, the frame structure of a dielectric heating press is shaped and dimensioned to form an applicator resonant at or near the frequency of oscillations utilized for dielectric heating of work disposed between the press platens which serve as heating electrodes, at least one of which is movable, the press frame providing the inductance of the applicator and the capacity between the platens providing the capacitance of the applicator. In its preferred form, the resonant press applicator is a metal tunnel having at least one electrically conductive fin or leg internally extending to one platen from wall structure of the tunnel, the other platen being similarly associated with or formed by opposite wall structure of the tunnel. The platens, or equivalent, are electrically connected to the press frame without interposition of insulators or insulating material subject to breakage during transmission therethrough of the pressure applied to the work and wasteful of the high-frequency power supplied for heating of the work.

In accordance with another aspect of the invention, the resonant tunnel applicator, whether or not provided with means for applying pressure to the work during its heating, is the frequency-determining circuit of the oscillator which supplies the high-frequency power for heating of the work. Preferably, the coupling between the resonant applicator and the oscillator is in the supra-optimum range to stabilize the high-frequency potential of the heating electrodes against changes in power-factor of the loaded applicator. In preferred arrangements, the tunnel applicator is inductively coupled to the anode circuit of the oscillator tube by a loop dimensioned and disposed to afford supraoptimum mutual inductance between the tunnel applicator and the anode circuit.

Further in accordance with the invention, in the preferred form of oscillator, alternatively, or preferably in addition to the aforesaid supraoptimum coupling, the grid-excitation of the oscillator tube is stabilized by deriving it from the electrode voltage by means of a potential divider including a capacitor in series with the effective input capacity of the tube.

In accordance with another aspect of the invention, the movable tunnel electrode is provided with supplemental capacity areas, not utilized for heating, which reduce the change or percentage change in total tunnel capacitance incident to change in electode spacing and which reduce the change of tunnel power-factor due to load variations including change in physical and electrical properties of the work.

The invention further resides in systems, arrangements and apparatus having the features of novelty and utility hereinafter described and claimed.

This application is a continuation of my copending application Serial No. 138,628, filed January 14, 1950, which is a continuation-in-part of application Serial No.

786,686, filed November 18, 1947. Both parent applications have been abandoned in favor of the present application.

For a more detailed understanding of the invention and for illustration of various embodiments thereof, reference is made to the accompanying drawings in which:

Fig. 1 schematically illustrates a dielectric heating system in which a press forms the resonant applicator and serves as the frequency-determining circuit of an oscillator;

Fig. 2 schematically illustrates a dielectric heating system in which the press of Fig. 1 forms a resonant applicator excited from an independent high-frequency source;

Figure 7:
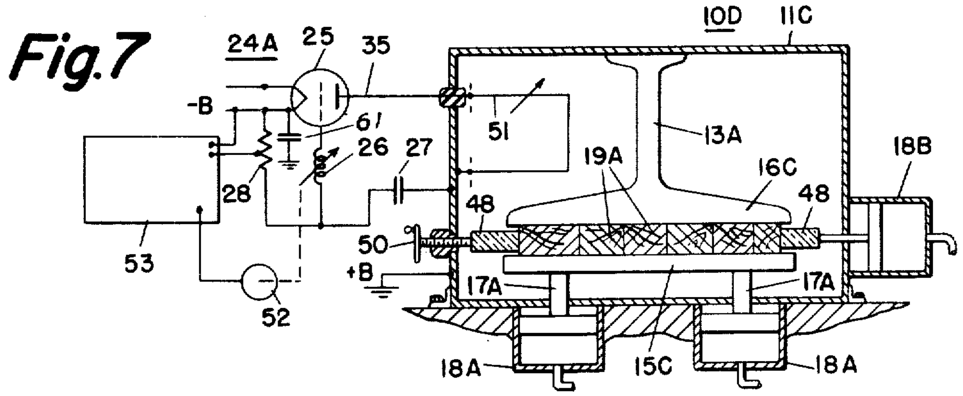
Figure 8:
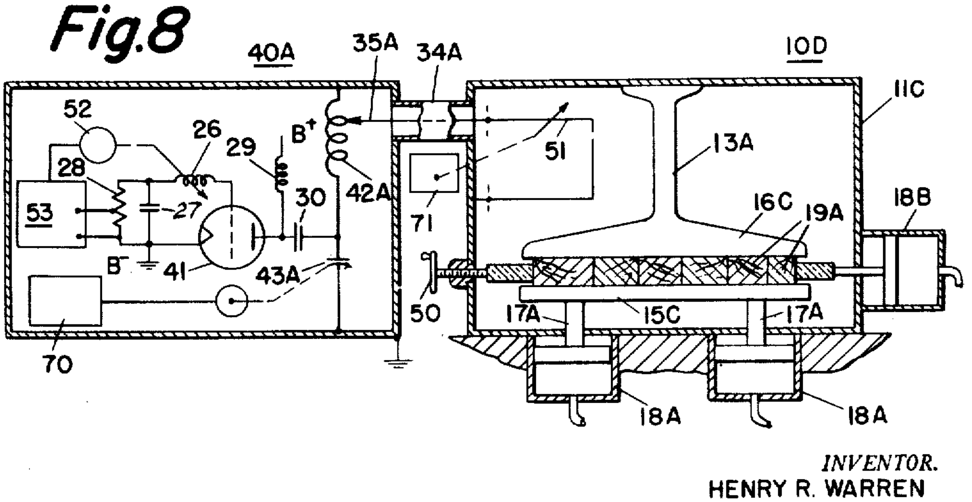
Figures 9, 10, 11:
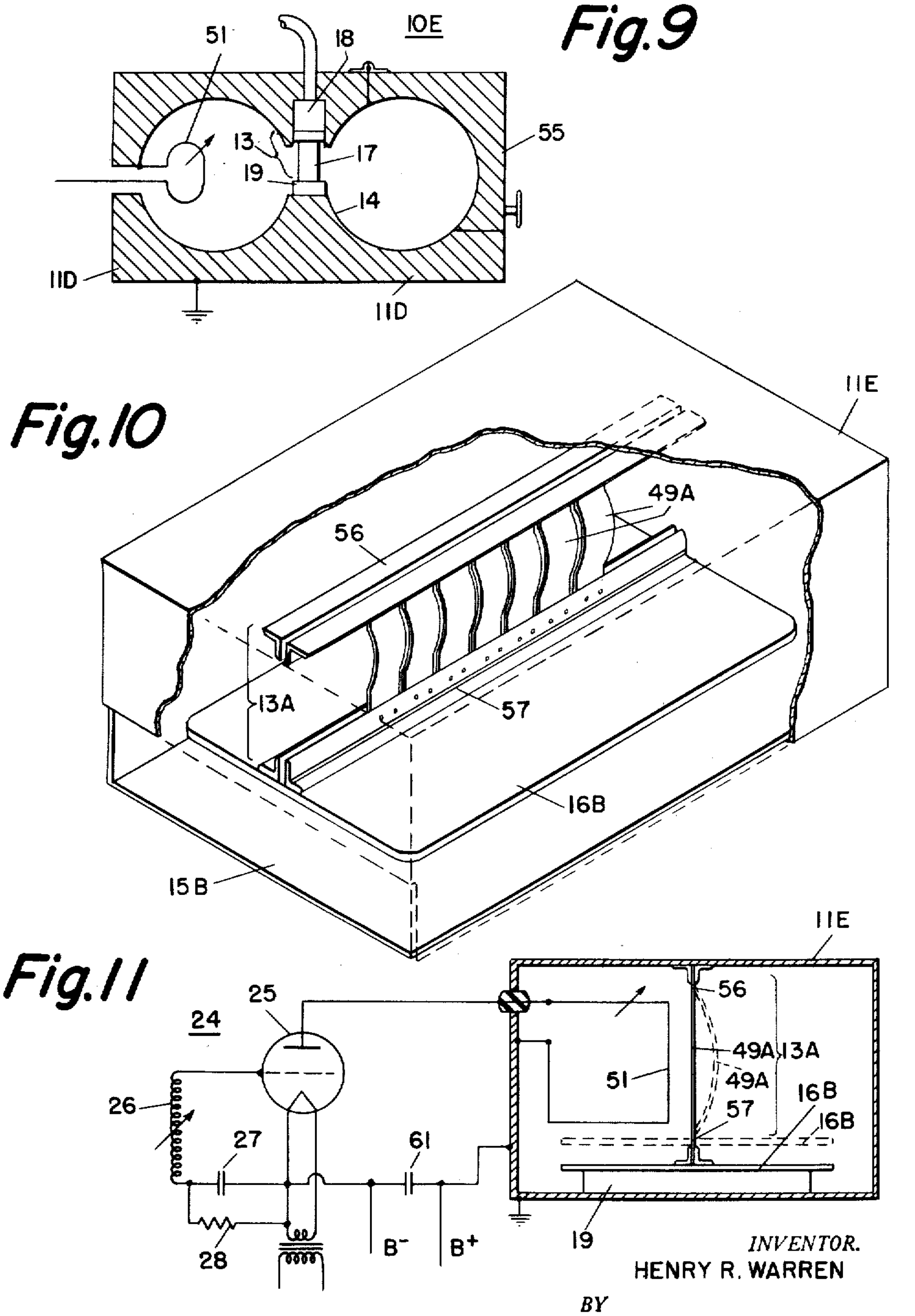
Figure 12:
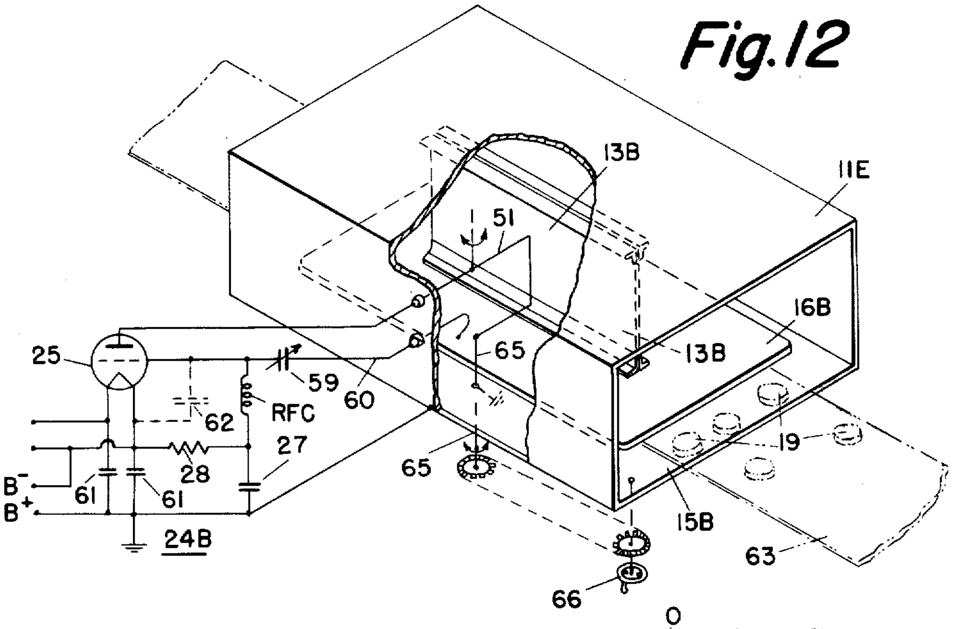
Figure 13:
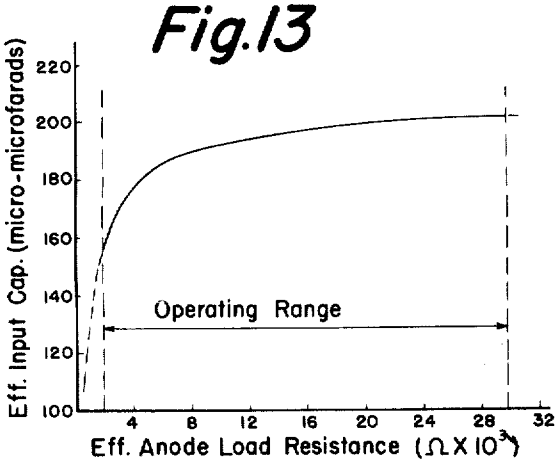
Figure 14:
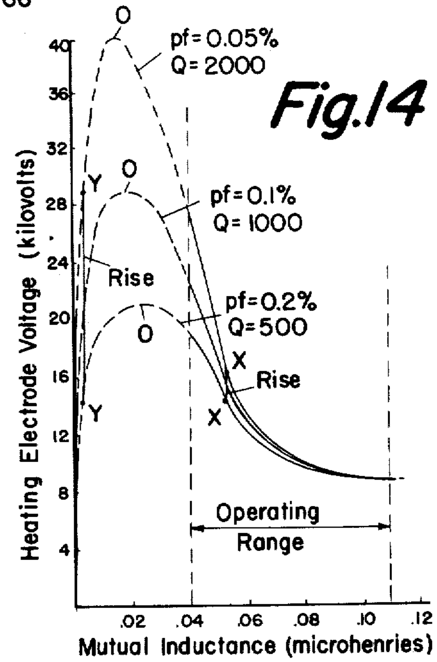
Figure 15:
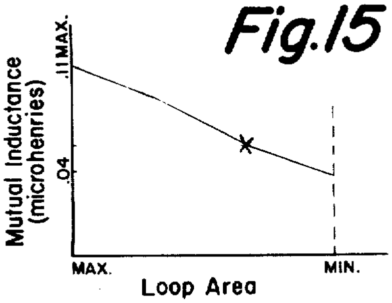
Figures 16, 17, 18, 19:
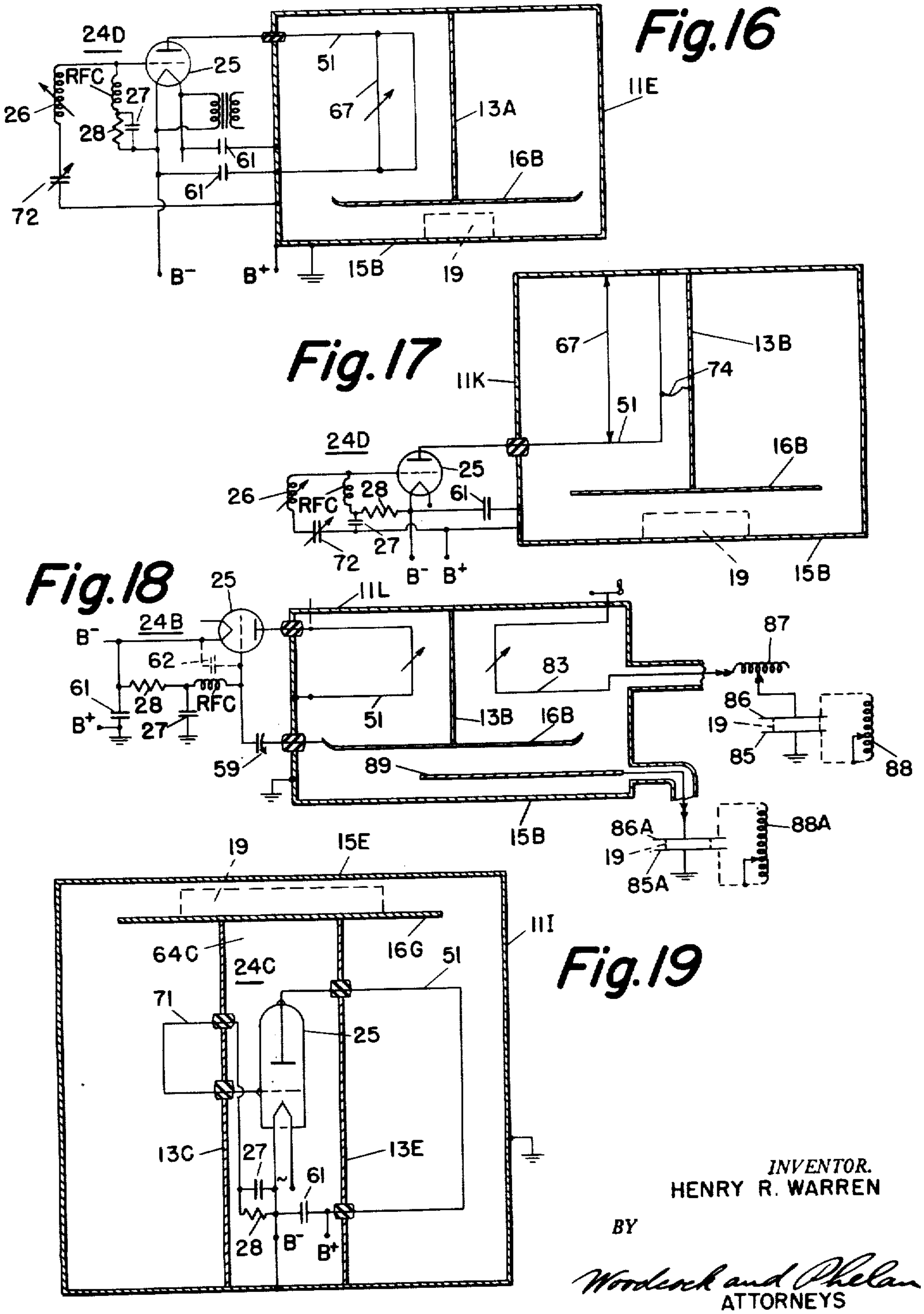
Figure 20:
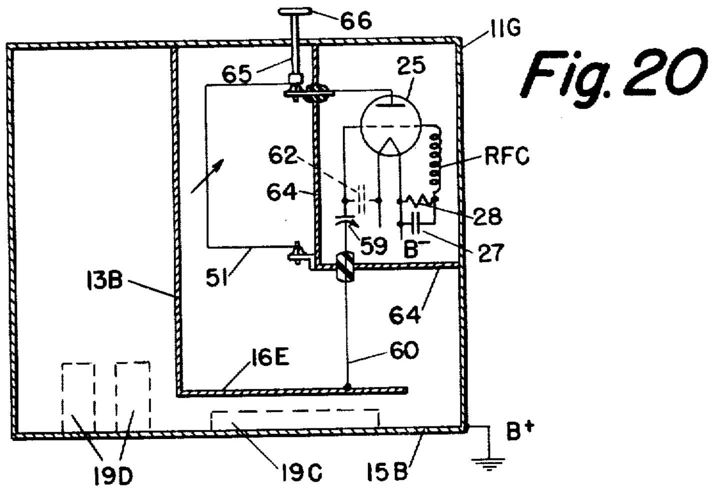
Figures 21, 22:
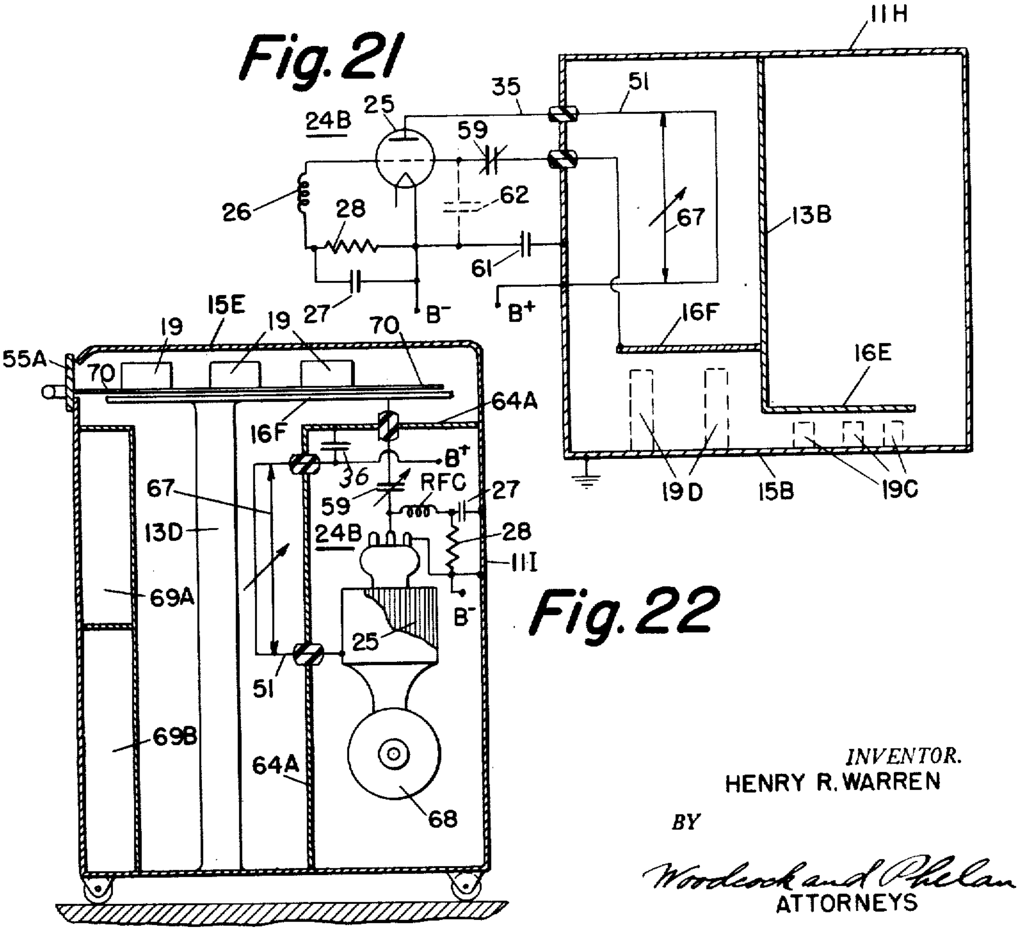
Figure 23:
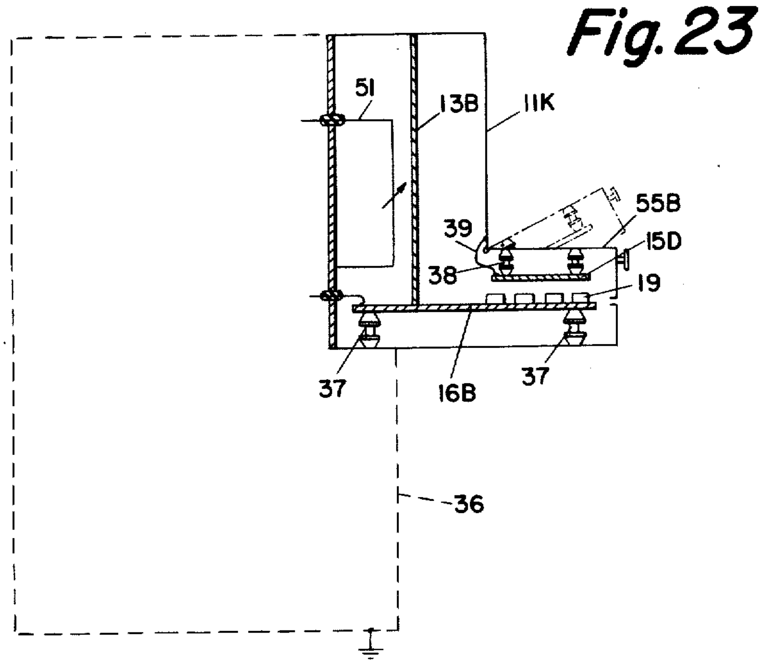
Figure 24:
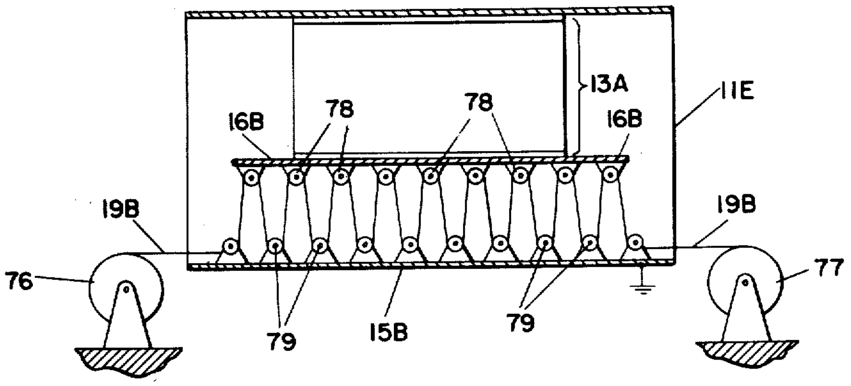
Figure 25:
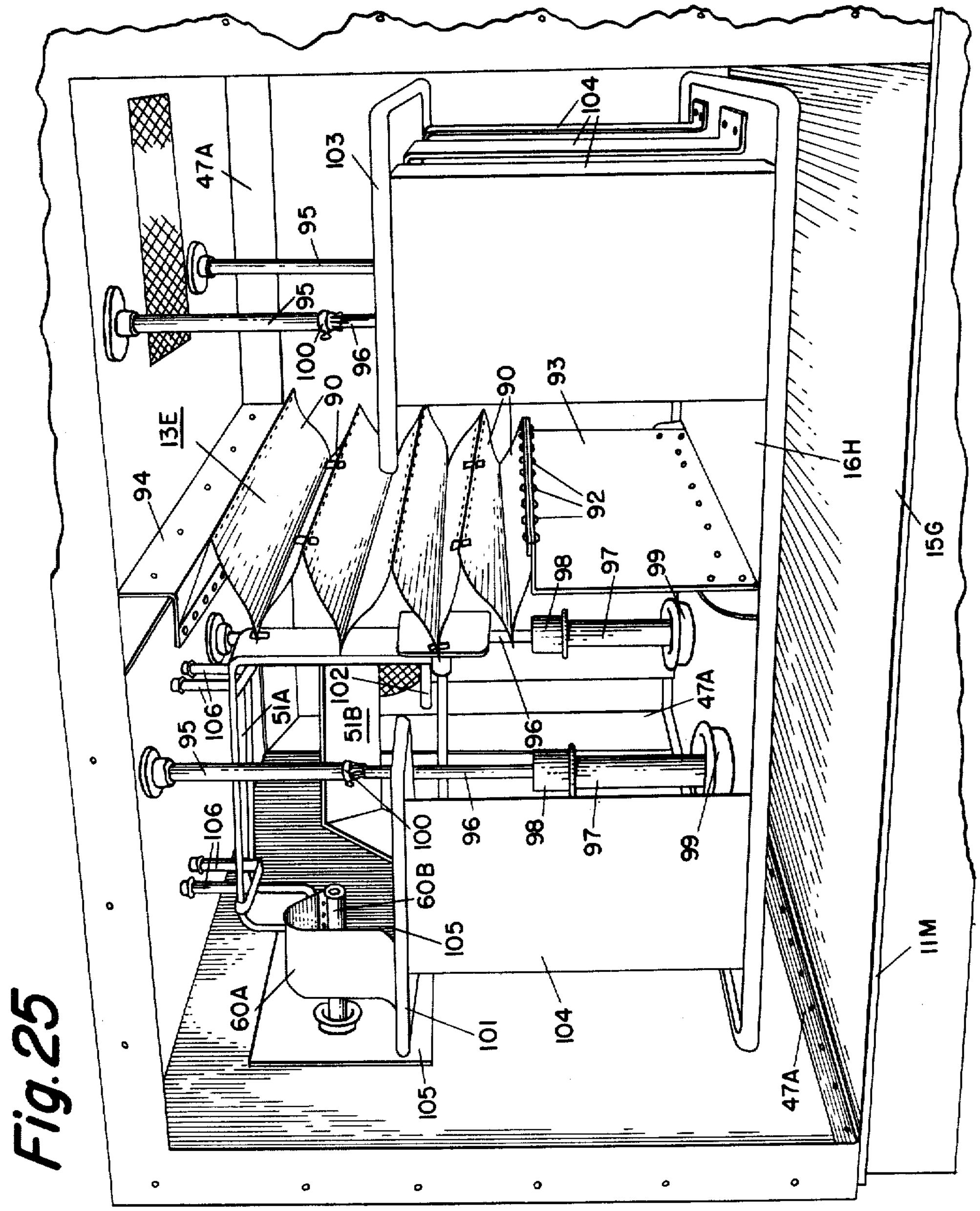
Figure 26:
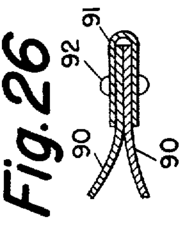
Figures 27, 28, 29, 30:
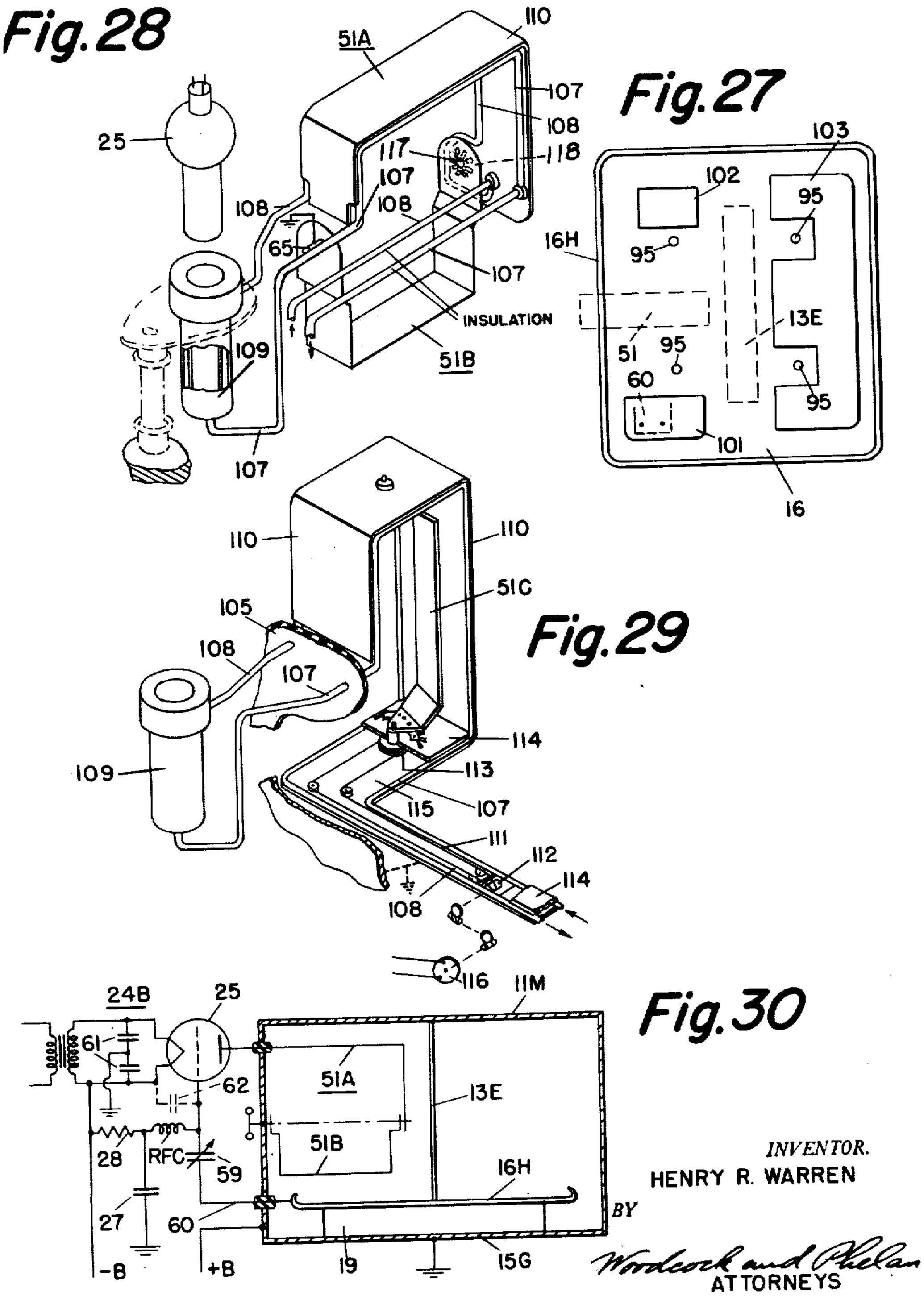

Fig. 7 schematically illustrates another form of tunnel applicator and as used as the frequency-determining circuit of an oscillator;

Fig. 8 shows an arrangement in which the tunnel applicator of Fig. 7 is excited from an independent oscillator;

Fig. 9 illustrates another form of press applicator;

Fig. 10, in perspective and in part broken away, shows the construction of another tunnel applicator;

Fig. 11 schematically illustrates a dielectric heating system in which the tunnel applicator of Fig. 10 is coupled to an oscillator tube;

Fig. 12 schematically illustrates a tunnel applicator as included in the preferred form of oscillator system;

Figs. 13, 14 and 15 are explanatory figures referred to in general discussion of the operating characteristics of resonant applicators in dielectric heating systems;

Figs. 16 and 17 illustrate tunnel applicators as used in modifications of the oscillator circuit of Fig. 7;

Fig. 18 illustrates a tunnel oscillator arrangement suited for heating of work in the tunnel applicator or between external heating electrodes coupled thereto;

Fig. 19 illustrates another form of tunnel-oscillator system;

Figs. 20 and 21 illustrate tunnel applicators suited for simultaneous heating of different sizes of work objects;

Figs. 22 and 23 illustrate other tunnel-oscillator units suited for dielectric heating of plastic preforms and the like;

Fig. 24 illustrates a tunnel applicator suited for heating of strip material;

Fig. 25, in perspective, illustrates the detailed construction of one form of tunnel applicator;

Fig. 26 is a detail view showing the mode of attachment of fin elements of Fig. 25;

Fig. 27 is a top plan view of the movable heating electrode of Fig. 25 and attached supplemental electrodes;

Fig. 28 is a perspective view showing details of construction of the coupling loop arrangement of Fig. 25;

Fig. 29 is a perspective view of a modification of the coupling loop arrangement of Fig. 28;

Fig. 30 schematically illustrates a tunnel-oscillator system incorporating the tunnel applicator of Fig. 25 in simplified form; and Figs. 31 to 38 are explanatory figures referred to in discussion of the operating characteristics of tunnel applicators.

Figures 1, 2, 3, 4, 5:
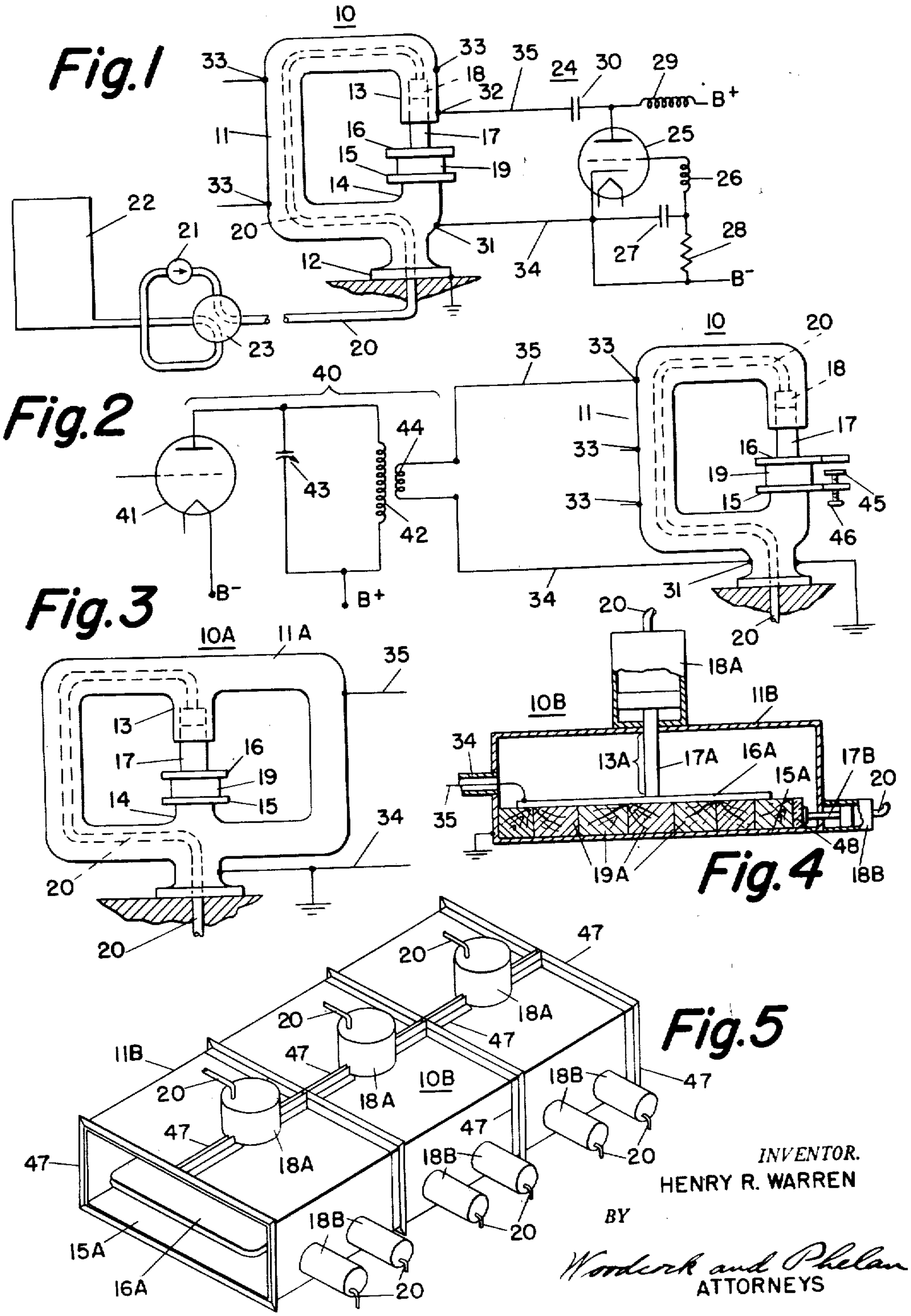
Fig. 3 illustrates a modification of the resonant press applicator of Figs. 1 and 2.
Figs. 4 and 5 are respectively sectional and perspective views of a tunnel type of press applicator for dielectric heating.

In the dielectric-heating system shown in Fig. 1, the press 10 comprises a metal C-shape frame 11 which forms a one-turn inductance which is grounded at or near the end formed by the base 12 of the press. To the opposed faces of the legs 13, 14 of the frame 11 are mechanically and electrically connected the platen members 16 and 15. The platen member 16 is attached to, or formed by the end of, the ram or piston 17 extending into cylinder 18 within the upper leg 13 of the frame 11 and forming a continuation thereof.

The press platens are electrically interconnected by the conductive press frame to form a resonant applicator whose resonant frequency is essentially determined by the capacity between the platens and the inductance of the press frame.

This resonant applicator, as later described, may be excited at essentially its resonant frequency to produce between the platen electrodes 15, 16 a high-frequency electric field which traverses the dielectric work 19 disposed between them. The current path provided between the heating electrodes 15, 16 by frame 11 is of low high-frequency resistance and the Q of the resonant press applicator 10 is high.

As in the other press applicators hereinafter described, there is no insulation interposed between either of the platens 15, 16 and its associated portion of the frame 11 and consequently there are avoided electrical and mechanical disadvantages, characteristic of many prior dielectric-heating presses, such as breakage of insulators through which pressure is applied to the platens, loss of high-frequency power in insulators exposed to the high-frequency field of platens, and electrical breakdown of such insulators.

The fluid line 20 for supplying fluid to the cylinder 18 is drawn through or attached to the press frame which it enters at the electrical ground or "cold" point of the press. In a hydraulic type press, the liquid line 20 may be connected to any suitable source for operation of the plunger of the press: specifically, it may be connected to a pump 21 which withdraws liquid from a reservoir 22 when the control valve 23 is in position shown in Fig. 1. To release the pressure on the work, the control valve is rotated to interchange the pump connections. A similar pressure-control arrangement may be used in the other presses later herein described.

This press arrangement may be used, for example, for scarf-joining of wood, or for gluing of the laminations of plywood, in which case the press platens or electrodes are flat plates which may have an area of many square feet. For molding or shaping of dielectric material, the press platens 15, 16 may be suitably embossed or shaped to obtain the desired configuration of the object or objects being heated between them: the platens may be in the form of rolls, smooth-surfaced or embossed, for pressure-rolling of dielectric sheeting or strip which is concurrently heated by the electric field between the roll-platens.

In the system shown in Fig. 1, the resonant applicator formed by the press frame and its spaced platens is connected so as to form the frequency-determining circuit of, and to be an essential part of, a self-excited oscillator 24 including the electronic tube 25. The oscillator circuit of Fig. 1 is a shunt-fed T. N. T. (Tuned anode:Non-tuned grid) type in which the press applicator serves as a tuned anode circuit. Specifically, one terminal of the grid coil 26 is connected to the grid of tube 25 and the other terminal thereof is connected to the cathode of the tube, so far as high frequencies are concerned, by the by-pass condenser 27. The feed-back coupling is afforded by the grid-anode capacity of the tube, supplemented, when necessary, by an external shunt capacitor (not shown). The grid-leak resistor 28 in shunt to by-pass condenser 27 is traversed by the rectified grid current of the tube to derive the direct-current bias for the grid from the generated oscillations. The anode of tube 25 is connected through a suitable high-frequency choke 29 to one terminal (B+) of a suitable high-voltage power source whose other terminal (B−) is connected to the cathode of the tube. Preferably, the anode supply is a high-voltage direct-current source, in which case the positive terminal (B+) thereof is connected to the anode of tube 25: a high-voltage, low-frequency power source may be used in this and all other oscillator circuits herein shown, in which case the tube 25 also serves as a power-frequency rectifier.

The cathode of the oscillator tube 25 is connected, as by conductor 34, to the press frame 11 at a point 31 at or near the grounded part of the frame. The anode of the tube may be connected, as by conductor 35, to the frame 11 at a point 32, for example, suitably spaced from point 31. The blocking condenser 30 serves to isolate the frame 11 from the high-voltage direct-current potential of the anode: condenser 30 is of low impedance to the high-frequency oscillations generated by the oscillator, so that so far as the high-frequencies are concerned, the point 32 of the frame is at anode potential when conductor 35 is connected to that point. To vary the coupling between the anode circuit of the tube and the resonant circuit formed by the press frame, the conductor 35 may be connected to other intermediate points 33 of the frame, the mutual inductance, and therefore the amount of coupling, between these circuits decreasing as the connection is moved closer to the point 31 of the frame. For reasons which are later discussed in connection with Fig. 14, the coupling, as for the other applicators herein disclosed, should preferably be in the supraoptimum range when the load is of material whose power-factor undergoes substantial change during heating by the high-frequency electric field between the platens.

In the system shown in Fig. 2, the resonant applicator 10, formed by the press frame 11 and its spaced platens 15, 16, is excited from a high-frequency source 40 which may comprise either a high-power oscillator or a low-power oscillator followed by one or more power amplifier stages. For brevity, it is assumed that the tube 41 is an oscillator tube whose frequency-determining circuit comprises an inductor 42 and a capacitor 43. The resonant applicator 10 is coupled to the oscillator 40 by a transmission line 34, 35, connected to suitably separated points 31 and 33 of the frame 11. Preferably, one of these conductors is connected to point 31 at or near the grounded part of the frame 11. At one end of the line, the conductors 34, 35 may be connected to a coupling coil 44 providing for transfer of high-frequency energy at the other end of the line to the applicator and yet isolating the press frame 11 from the high-potential direct-current plate voltage of the tube 41.

With this arrangement, as the spacing between the electrodes 15 and 16, or their equivalent, is varied to accommodate work of different size, or as the electrical characteristics of the work change during heating, the resonant frequency of the applicator changes. To effect proper excitation of the applicator, as its resonant frequency is so changed, the frequency of the oscillations generated by the source 40 must be correspondingly changed as by adjustment of the condenser 43 of the frequency-determining circuit of the oscillator. When this is not feasible, as for example when the same source 40 is used concurrently to supply high-frequency power to several applicators, the applicator 10 may be retuned by adjustment of a variable capacitor effectively in shunt to the platen capacity. Specifically, as shown in Fig. 2, this variable compensating condenser may comprise a plate 45 connected to the lower electrode 15 and adjustable by knob 46 toward and away from an extension of the upper electrode 16. In general however, since the need for retuning may arise during heating of a load, it is far more desirable so to connect or couple the resonant applicator 10 that it controls the frequency of the generated oscillations, either by making the resonant applicator an essential part of the oscillator circuit or by suitably coupling it to an oscillator whose frequency is "pulled" by the higher Q applicator.

In the modification shown in Fig. 3, the frame 11A of press 10A is of double C-shape so to form two one-turn loops terminating in the common legs 13 and 14 to which the heating electrodes 16 and 15 are conductively connected. This arrangement affords enhanced mechanical strength and, since the loops are electrically in parallel, effectively reduces the inductance tuned by the capacity between the platens 15 and 16. Assuming the frame and platen dimensions are comparable to those of Fig. 1, the resonant frequency of the resonant applicator of Fig. 3 is substantially higher than that of Fig. 1 and so affords a greater heating effect for similar potential differences between the platens. With the double-C frame of Fig. 3 as compared with the single-C frame (applicator 10 of the preceding figures), a higher percentage of the total inductance of the resonant applicator is concentrated in the frame legs 13, 14 and plunger 17 common to both inductive loops. Also as compared with applicator 10, the resonant applicator 10A of Fig. 3 has a higher Q contributed to both by the enhanced current-conducting area of the frame and by some reduction of the stray high-frequency fields.

Like the applicator of Fig. 1, the press applicator 10A of Fig. 3 may be excited essentially at its resonant frequency to subject work between its electrodes 15, 16 to a high-frequency field: preferably it is connected to serve as the frequency-determining circuit of the associated high-frequency oscillator.

The dielectric-heating press 10B shown in Figs. 4 and 5 is particularly suited for production of laminated plywood sheets of substantial area (for example, 4 feet by 8 feet), for production of large panels by edge-bonding of wooden strips, and for like purposes requiring large heating electrodes and dissipation of many kilowatts of radio-frequency power in the dielectric load.

The frame is in the form of an elongated metal tunnel or housing 11B of substantially rectangular cross-section. The tunnel walls may be of relatively thin sheet metal reinforced, as suggested by brace members 47, to provide the strength and rigidity necessary to resist deformation by the pressure applied to the work. The dimensions and disposition of the reinforcing members will vary widely to suit the pressure-resisting requirements of different installations. In edge-bonding, for example, the pressure applied laterally is quite substantial: the pressure applied vertically is relatively light but sufficient to prevent buckling of the work by the applied side pressure.

For applying vertical pressure, a plurality of pressure-applying devices, such as cylinders 18A, are spaced lengthwise along the top of the tunnel 11B with their plungers or rams 17A attached, without interposition of any insulation, to correspondingly spaced regions of the elongated platen 16A which serves as the upper electrode of the tunnel applicator. In this modification, as well as others herein described, the bottom of the tunnel may itself serve as the lower electrode: alternatively, the lower electrode may be an auxiliary conductive member, movable or stationary, conductively connected to the bottom or side wall structure of the tunnel housing. The absence of insulators, as in the presses previously and hereinafter described, avoids mechanical and electrical disadvantages characteristic of prior dielectric heating presses.

For applying lateral pressure to the heating load, as in edge-bonding of wooden strips 19A, the applicator frame may be provided with a second series of pressure-applying devices, exemplified by cylinders 18B supplied from pressure lines A20 having plungers or rams for applying lateral pressure to the work strips 19A either directly or through an interposed filler block 48.

In this tunnel-press applicator, as in those of Figs. 1 to 3, the capacitance of the resonant applicator is essentially the capacity between the heating electrodes or platens and the inductance of the resonant applicator is that of the conductive structure which electrically interconnects the heating electrodes. However, in the tunnel press applicator 10B, all, or practically all, of the inductance is concentrated in the central vertical conductor or fin 13A, afforded in this modification by those portions of plungers 17A which extend between their electrical connection to electrode 16A and their electrical connection to the sheet metal wall structure of the tunnel. The row of plungers 17A effectively forms an inductance structure 13A, elongated in a direction transverse to the current flow, between upper electrode 16A and the upper wall structure of the applicator housing 11B. Such elongation of an inductance structure in the region of its attachment to a heating electrode may be utilized, in all resonant applicators herein shown, to obtain substantial uniformity of the potential of elongated heating electrodes in the direction of their elongation.

The high-frequency resistance of the central conductor 13A and of the electrode 16A is very low. The resistance of the remainder of the current path afforded by the extensive area of the wall structure of the tunnel is also very low so that, as in all tunnel applicators herein described, the Q is very high despite the high ratio of capacitance to inductance.

Because of their high frequency, the circulating currents are practically confined to the inner surface of the applicator housing and consequently all external surfaces including the cylinders 18A, 18B and their pressure lines are at ground potential. The applicator housing serves as a radio-frequency shield for the internal components which are at very high radio-frequency potential. Therefore the radiation losses are low which minimizes radio interference and further contributes to high Q of the tunnel applicator.

Another and very important advantage, later discussed in more detail, of the tunnel type of applicator is its unique suitability for dielectric heating of load materials having very low power-factor including foam rubber articles, extruded rubber hose and gaskets as well as those having substantially higher power-factor such as wood.

The tunnel press applicator of Figs. 4 and 5 may be excited as in Fig. 1 or Fig. 2; preferably, however, it is excited by a loop in manner later discussed in connection with other tunnel applicators.

Figure 6:
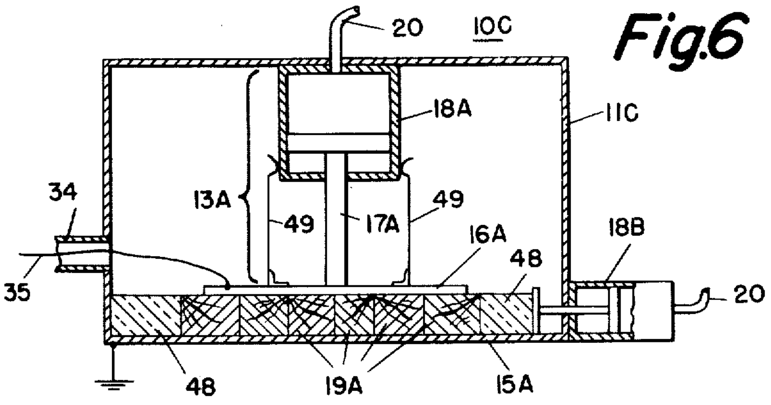
Fig. 6 is a modification of the tunnel applicator of Figs. 4 and 5.

In the modified form of tunnel press 10C shown in Fig. 6, the construction is similar to that shown in Figs. 4 and 5 except that the vertical pressure cylinders 18A are within the tunnel and serve as a significant part of the inductance of the resonant applicator. Practically all of the remainder of that inductance may be formed by the projecting portions of the rams 17A, as in Fig. 4.

Preferably, however, each of the rams or plungers is effectively electrically shunted by a circular array of conductive straps 49 connected at their lower ends to the upper face of the movable heating electrode or platen 16A. The upper ends of straps 49 engage and are preferably fastened to the periphery of the corresponding cylinder 18A. Each peripheral array of straps defines a substantially field-free space for the associated plunger 17A, or equivalent electrode-moving element. In such arrangement, the row of cylinders and strap members forms the elongated inductive element 13A of the tunnel.

The straps 49 are preferably of relatively springy metal of high electrical conductivity, such as beryllium-copper or some other springy metal coated with copper or other metal of high conductivity. In the arrangement just described, the straps are arranged peripherally about each cylinder to afford a low resistance path for the heavy circulating currents between the upper wall of the tunnel and the "hot" electrode 16A: with such arrangement, the straps, instead of the plungers, serve as part of the tunnel inductance.

Alternatively, as in later herein described modifications, the high-frequency inductance structure extending from the upper movable electrode to the upper wall structure of the tunnel may consist of flexible fin structure, such as a wide sheet or straps of beryllium-copper, or the like, attached both to the movable electrode and to the inner face of the upper wall of the tunnel. Specifically, in Fig. 6, the straps 49 may be replaced by two rows of straps or two wide sheets extending lengthwise of electrode 16A on opposite sides of the cylinders with the opposite ends of each strap or sheet electrically connected between electrode 16A and the top wall structure of the tunnel. In such arrangement, the straps or sheets, rather than the cyldiners and plungers, form all, or practically all, of the tunnel inductance. This arrangement has the advantage that even for widely spaced plungers the magnetic flux path is forced to encircle the elongated fin inductance structure instead of tending to break into several paths encircling the respective cylinders and associated plungers.

The applicator 10C of Fig. 6 may be excited as in Fig. 1 or Fig. 2 to subject work between the electrodes to a high-frequency field: preferably, however, it is excited by a loop as later discussed in connection with other applicators.

In the modified form of tunnel applicator 10D shown in Fig. 7, the positions of the stationary and movable electrodes are interchanged, as compared to Figs. 4 to 6, so that the cylinders 18A, or equivalent devices, may be disposed beneath the tunnel housing 11C in the press foundations. As in the modifications of Figs. 4 to 6, the cylinders 18B, or equivalent devices, for applying lateral pressure to the load extend externally of the tunnel from one of its side walls. In any of these modifications, the stroke of the side rams may be small and the tunnel adapted for a wide range of load widths by provision of manually adjustable pressure screws 50 along the opposite side wall, Fig. 7.

The stationary electrode 16C, Fig. 7, is formed by the lower wide and elongated face of a beam attached to the inner face of the upper wall structure of the tunnel and forming part of the press frame. The movable electrode 15C of corresponding length and width is supported by or upon the upper ends of the vertical plungers or rams 17A.

The resonant frequency of applicator 10D is essentially determined by the inductance and capacity of the applicator structure itself. Specifically, the capacitance of the applicator is internally of the tunnel enclosure and is chiefly that between the opposed faces of the electrodes 15C, 16C; the inductance of the applicator is internally of the tunnel and is predominantly that of the conductive structure disposed within the tunnel enclosure and connecting the electrodes between the upper and lower walls thereof. More particularly, the web or central fin 13A of the stationary frame structure is a significant portion of the total tunnel inductance and essentially the remainder of it consists of the inductance of portions of plungers 17A within the tunnel or of flexible conductive straps (not shown) respectively attached to the movable electrode 15C and to the bottom of the tunnel or to the side walls below the uppermost position of the movable electrode.

As in Fig. 1 and in other figures later herein described, the resonant applicator 10D of Fig. 7 may be, and preferably is, the frequency-determining circuit of a self-excited oscillator. In Fig. 7, the resonant applicator 10D is coupled to the anode circuit of the oscillator tube 25 by loop 51 which is disposed within the housing 11C and which is threaded by the high-frequency magnetic field encircling the web or fin 13A. This loop is adjustable, as about a horizontal or vertical axis, to vary its area normal to the lines of the magnetic field so to permit smooth variation of the coupling between the resonant applicator and the anode circuit.

The mutual inductance and therefore the coupling between the tunnel and anode circuits may, however, be varied in many other ways, some of which are herein specifically mentioned. For reasons later more fully discussed, the range of adjustment of the coupling preferably should be entirely in the supraoptimum range.

Conductor 35, which should be very short and of low impedance at the oscillator frequency, extends from the anode of the oscillator tube 25 through an insulator in a wall of the tunnel to one terminal of loop 51. The cathode of tube 25 is grounded through by-pass condenser 61 and the other terminal of the loop is grounded to a tunnel wall so to complete a high-frequency circuit from anode to cathode. A path for flow of direct current to the anode is provided from a high-voltage supply whose positive terminal (B+) is grounded and whose negative terminal (B−) is connected to the cathode of tube 25. The press frame or tunnel 11C is at ground potential for both the high radio-frequency and the high direct-current voltages involved in dielectric heating.

To maintain proper grid-excitation for safe operation of tube 25 despite variations in electrical load occurring during heating of dielectrics or during adjustment of the oscillator loading, the inductance of grid coil 26 may be automatically adjusted by motor 52 in response to variations in magnitude of the rectified grid current or self-derived grid bias of oscillator tube 25. The block 53 is generically representative of the arrangement for that purpose disclosed in my Letters Patent 2,517,948. Preferably, however, the tunnel applicator is embodied in a novel oscillator circuit hereinafter described in which the grid-excitation adjusts itself for safe, efficient operation under widely different power-factors of the tunnel as occasioned by removal or insertion of work or change in characteristics of the work during heating without need for any such auxiliary control equipment.

As in Fig. 2, the tunnel press 10D of Fig. 7 may, as shown in Fig. 8, be supplied from a separate high-power oscillator 40A whose frequency-determining circuit comprises inductor 42A and capacitor 43A. The tunnel applicator is coupled to the oscillator 40A by a transmission line 34A, 35A whose conductors are connected to terminals of the loop 51 and to an adjustable fraction of oscillator inductor 42A. With this arrangement, the changes of resonant frequency of the applicator for different spacings of the heating electrodes and for changes in dielectric constant of the work require either retuning of the oscillator to the new resonant frequency of the applicator, as by adjustment of its capacitor 43A, or retuning of the applicator to the oscillator frequency as by adjustment, in manner analogous to Fig. 2, of a capacitor (not shown) in shunt to the capacitance of the heating electrodes 15C, 16C of the tunnel. The blocks 70 and 71 are generically illustrative respectively of control arrangements for adjusting the tuning condenser 43A of the oscillator and the coupling loop 51 of the tunnel.

The tunnel applicator of each of Figs. 4 to 8 may be considered as formed by an elongated enclosure having therein elongated heating electrodes electrically interconnected by wall structure of the enclosure through fin inductance structure extending from one or both of the electrodes and which fin inductance structure is elongated in the direction of elongation of said electrodes. Applicators of such configuration are well suited, as previously indicated, for many dielectric heating applications.

A resonant tunnel applicator having a narrower field of utility is shown in Fig. 9. In the toroidal press applicator 10E, the resistance of the resonant circuit formed by the press frame 11D is small, the inductance is essentially concentrated in the central members 13, 17, 14 of the frame, the capacitance is essentially concentrated between opposed electrode-forming faces of members 14, 17 and all external faces of the press are at ground potential. However, because of its geometry, the toroidal applicator 10E is not well suited for many uses, such as heating or drying of large sheets of wallboard for which the tunnel type of applicator is well adapted. The toroidal cavity type of applicator is suited, for example, for heating or molding small dielectric objects or for cooking of edibles, in which latter case the member 17 need not apply pressure.

This resonant applicator also is preferably used as the frequency-determining circuit of the associated oscillator system and the loop 51 preferably provides supra-optimum coupling between the resonant applicator and the anode circuit of the oscillator tube.

To provide for access to the interior of the cavity, as for insertion or removal of work 19, the frame 11D is provided with one or more doors or covers 55 which may be movably or removably attached to the fixed portion of the frame.

In the presses of Figs. 4 to 9, the framework should be strong and heavy enough to resist the stresses and strains imposed by the pressure-applying devices, and since no insulators are included in the plunger-platen system, the invention is particularly suited for very heavy presses. When the tunnel applicator is to be used for work requiring application of little or no pressure, its construction, as in types subsequently described, may be considerably simplified and lightened.

In the dielectric heating applicator 11E shown in Fig. 10, the upper heating electrode 16B and the walls of the tunnel may be of relatively thin sheet metal, such as aluminum. The bottom wall of the tunnel may itself serve as the lower heating electrode: alternatively, the lower heating electrode may be an auxiliary conductive member, movable or stationary, conductively or otherwise coupled to the bottom or side wall structure of the tunnel housing. The heating electrodes and walls of the applicator are of large surface area and thus, although the total circulating current in the tunnel may be very high, as over a thousand amperes, the current density in the wall structure is low. However, the current density is higher in the central tunnel conductor or fin 13A electrically connecting the electrode 16B to the upper tunnel wall and consequently this fin structure, which may be a single wide sheet or a plurality of straps, should be of high conductance. The particular fin construction shown in Fig. 10 comprises a row of wide straps 49A of copper or copper alloy extending in the direction of elongation of electrode 16B. The straps 49A are attached at their upper ends to a supporting bar or frame member 56 in turn attached, as by welding, to the upper wall of the tunnel and extending parallel to the side walls. The lower ends of straps 49A are attached to a conductive member 57 extending lengthwise of the elongated heating electrode 16B.

The ends of the fin 13A are so shaped or so spaced from the end walls of the tunnel as to leave an unobstructed path around the fin for its high-frequency magnetic field: this relation should exist in all tunnel applicators, including those herein described, when the tunnel has end walls which close the ends of the applicator at least above the upper electrode. As in other tunnel applicators herein described, the ends of tunnel 11E may be left open, at least part way up from the bottom wall for insertion, removal or passage through the tunnel of the objects or material to be heated. For batch operation, one or both ends of the tunnel applicator may be provided with doors or removable panels for insertion and withdrawal of work and for minimizing radiation from the tunnel during a heating run.

The inductance of the tunnel tank circuit can be adjusted by removal, addition of, or variation in spacing between straps 49A, and when it is desired to minimize voltage gradients along the elongated electrode, the straps should be disposed in substantially equally spaced relationship along a major portion of the length of the electrode. If on the other hand, a voltage rise toward one end of the electrode is desired, the row of straps may be shifted toward the other end of the electrode.

The end straps of the fin 13A may be of highly conductive soft copper and the intermediate straps of beryllium-copper; higher conductivity of the end straps is desirable because the fin current is there highest. The end straps may be of greater cross section as obtained, for example, by several straps face-to-face, in avoidance of excessive localized heating which would cause increased losses and reduction in Q of the applicator.

The flexibility of the straps 49A makes the fin 13A extensible, i. e., it permits the upper electrode to be raised or lowered, as shown in Fig. 11, to accommodate work loads of different physical or electrical characteristics or, when the electrode is spaced from the load, to adjust the potential gradient through the work. Suitable structure, not shown in Fig. 10, is provided to hold the electrode 16B in adjusted position at desired height above the bottom wall 15B or equivalent "cold" electrode.

A tunnel applicator similar in construction to Fig. 10 employing a housing having height, length and width approximately of 3, 12 and 8 feet respectively with an electrode 16B having length and width respectively of 10 and 5 feet has been operated at frequencies of from about 12 megacycles to about 16 megacycles for dielectric heating of pulp wallboard panels requiring dissipation in the work of radio-frequency power of the order of 125 kilowatts and radio-frequency potentials between the heating electrodes of the order of 25,000 volts.

As indicated in Fig. 11, the applicator 11E may be coupled to an oscillator tube 25 to serve as the frequency-determining circuit of a self-excited oscillator system of the type discussed in connection with Fig. 7. Specifically, as in other tunnel oscillators herein described, the coupling between the oscillator tube and the tunnel may be effected by a power-transfer loop 51 disposed in the high-frequency magnetic field of the fin 13A: the degree of coupling, as later discussed, is preferably supraoptimum throughout the range of adjustment of the loop.

Figure 37:
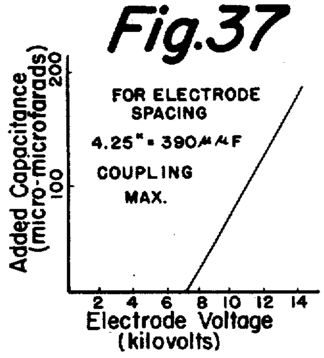

As shown by the full and dotted line positions of the fin 13A and electrode 16B, Fig. 11, as the electrode spacing is decreased, the fin approaches the loop and increases the degree of coupling which is in sense to compensate for the tendency of the voltage of the tunnel electrode 16B to rise, Fig. 37, with increase of tunnel capacitance as occurs with decrease in electrode spacing. The effect of coupling and electrode spacing upon the electrode voltage is later more fully discussed.

Among the important and singular advantages of resonant tunnel applicators such as herein described is that they have made possible, on commercial scale, the efficient uniform heating of large sheets or masses of dielectric materials of very low power-factor, i. e., of 1% or less, so permitting the application of dielectric heating equipment for such purposes as heating or drying of pulp wallboard, foam rubber, pure gum rubber, sand cores and the like. With conventional heating circuits, the percentage of the power dissipated as circuit losses is excessively high for power-factors lower than about 1%. Furthermore, with conventional heating circuits, operation at higher frequencies to obtain efficient heating at voltages low enough to prevent arcing and with electrodes of large area to accommodate large sheets, panels and the like requires "stubbing" which, aside from difficulties of adjustment, is cumbersome and so reduces the unloaded Q of the heating circuit that heating of low power-factor work is impractical.

With tunnel applicators herein disclosed, it has been proved possible to obtain efficient, uniform heating of very low power-factor work requiring high-frequency energy at high power levels, in excess of 100 kilowatts (in some cases 250 kilowatts). Satisfactory heating has been accomplished, with commercially available tubes, efficiently in the range of about 5 to about 50 megacycles, for which frequencies large heating electrodes may be used without need for "stubbing."

In contrast with the resonant circuits heretofore used for dielectric heating at these frequencies, the tunnel applicator, unloaded, has an exceptionally high "Q" ("Q's" of over 5,000 are obtainable) affording unusually high electrode voltage without attendant excessive circuit losses. Even with dielectric work having a power-factor of much less than 1%, the percentage of the high-frequency power delivered to the tunnel which is utilized in useful heating of the dielectric work is of the order of 90%. By way of specific example, a tunnel applicator (Fig. 10) having an unloaded "Q" of 2750, and a 5′ x 10′ electrode of 370 micro-microfarads capacity operating at a frequency of 14 megacycles with a peak electrode voltage of 32,000 volts, delivered 148 kilowatts in heating work having a power-factor of 0.9% with a power loss of only 6 kilowatts in the applicator. A generator using a conventional heating circuit having an unloaded "Q" of 200, and delivering the same power (148 kilowatts) to identical work, will be forced to supply 83 kilowatts of wasted power to the heating circuit. Although uniquely suited therefor, the resonant tunnel applicators herein disclosed are not limited to dielectric heating of very low power-factor work: they can and have been used for heating of materials having higher power-factors and which can be heated, though at lower efficiencies, by conventional applicators.

Another significant advantage of the tunnel applicator is that it is particularly suited for supraoptimum coupling between the applicator, forming the power-receiving load circuit, and the supply circuit, which coupling, as later more fully discussed, is helpful in minimizing change in heating electrode voltage with change of applicator power-factor and in minimizing tendency for the oscillator-frequency, upon change in work characteristics, to jump with consequent failure of transfer of power to the applicator.

Additional advantages of the tunnel applicator are that substantial uniformity of the voltage along an elongated heating electrode may be obtained without "stubbing": and that, without "stubbing," the frequency may be suitably high for safe, efficient heating despite the high electrode capacity required for dielectric work of large area.

Furthermore, the tunnel applicator when having flexible bowed fin structure, as in Fig. 11, provides automatic change of coupling with change in electrode spacing.

When the tunnel housing forms a complete enclosure, it may be used for dielectric heating in air or other gaseous or vapor medium and, when desired, at pressures higher or lower than atmospheric. Furthermore, the circuit-losses in a completely enclosed applicator raise the ambient temperature and so contribute to heating and to uniformity of the ultimate temperature of the dielectrically heated work.

Many various types of oscillator circuits may be used for exciting the resonant C-frame structures and resonant tunnels herein shown: the preferred type of oscillator circuit 24B, shown in Fig. 12 and also in other figures later described, automatically maintains proper grid-excitation of the oscillator under wide variations of work characteristics during a run, or for widely different work conditions of different heating runs, without need for auxiliary control equipment, such as shown in Fig. 7, or for close supervision by an operator. In this preferred oscillator system, the grid-excitation voltage is derived from the "hot" electrode voltage by a voltage-divider arrangement which automatically changes the ratio of these voltages with change in loading.

Referring to Fig. 12 as exemplary of such preferred oscillator system, a power-transfer loop 51 in the anode or power-delivery circuit of the oscillator tube is disposed within the tunnel housing inductively to couple the anode circuit and resonant applicator, forming the power-receiving load circuit, as in some of the oscillator systems previously described herein. However, in oscillator system 24B, the grid of the tube 25 is connected to the heating electrode 16B or to a suitable point on the fin inductance 13B by a capacitor 59. The cathode of tube 25, so far as the operating frequency of the tunnel is concerned, is grounded through the by-pass condensers 61. As graphically shown by any of the curves of Fig. 14, the radio-frequency potential difference between the tunnel electrodes 15B, 16B may be adjusted to any desired value within a wide range by selection or adjustment of the coupling between the anode loop 51 and applicator. Since the grid-excitation voltage is derived from the heating electrode voltage, the latter must have a minimum value sufficient for proper grid-excitation. As the coupling between the anode circuit and the resonant applicator is varied, as by loop 51, in a direction or sense to increase the heating-electrode voltage, the capacitor 59 is varied in a sense to prevent excessive grid-excitation.

The radio-frequency voltage between the tunnel-heating electrodes may be, and usually is, many times the radio-frequency grid-potential, and hence the capacitor 59 of oscillator circuit 24B is selected or adjusted to have a capacity much less than the effective input capacity 62 of the associated tube. The radio-frequency potential of the grid of tube 25, for any setting of capacitor 59, is always a fraction of the radio-frequency potential difference between the tunnel electrodes 15B, 16B and is inversely proportional to the ratio of the total reactance of the series-connected capacitors 59, 62 to the reactance of the effective input capacity 62 of oscillator tube 25. (Capacitor 62 represents the grid-cathode capacity alone or additive to the capacity of an external shunt condenser.) With low power-factor loads, the radio-frequency potential of the grid may be one-twentieth of the heating-electrode potential.

With loop 51 preset to provide the desired radio-frequency voltage on electrode 16B, or equivalent, and with capacitor 59 preset for proper grid-excitation, the capacity 62 has an effective value which, as now explained, inherently varies with the tunned load so that the ratio of the two reactances of the capacitor voltage-divider 59, 62 varies automatically with load and in proper sense to stabilize the grid current.

The effective input capacity $C_t$ of tube 25 may be expressed by the following equation:

$$C_t = C_{gk} + C_{gp}\left(1 + \frac{\mu R_b}{R_p + R_b}\right) \qquad (1)$$

where $C_{gk}$=internal grid to cathode capacity of tube 25
$C_{gp}$=internal grid to anode capacity of tube 25
$\mu$=effective amplification factor of tube 25
$R_p$=effective anode-resistance of tube 25
$R_b$=effective anode load resistance As shown by Equation 1, the effective grid-cathode capacity ($C_t$) of tube 25 is proportional to the effective anode load resistance $R_b$, which with the tunnel applicator, is determined substantially entirely by the load being heated because of the high "Q" of the tunel itself: specifically, and by way of example, the unloaded "Q" of various tunnels used has been in the range of from 1,000 to over 3,500.

A decrease in applicator power-factor, as occurs upon removal of part or all of the work, results in an increase in the effective anode load resistance $R_b$ (see Fig. 36) and causes a corresponding increase in the effective input capacity ($C_t$) of the tube (see Fig. 13). Such increase of the effective anode load resistance $R_b$ (as apepars from Equation 1), automatically increases the capacitance and thus reduces the reactance of capacitor 62 of the potential-divider network 59, 62, with corresponding automatic reduction of the grid voltage to a still smaller fraction of the heating-electrode voltage. Thus, the voltage-divider network provides a grid-excitation voltage which varies in compensatory sense with changes in power-factor of the loaded applicator.

Fig. 13 graphically shows the interrelation of the effective input capacity of the oscillator tube and the effective anode load resistance in a typical tunnel oscillator system 24B: the specific numerical values indicated in Fig. 13 are for the tunnel of Fig. 25 with a Machlett 5619 tube.

With conventional tuned-grid type oscillators, the minimum value of mutual inductance between the anode and grid circuits for which high-frequency oscillation will occur is given by the equation:

$$(2) \qquad M_{min}=\frac{\mu L_s}{2}-\sqrt{\left(\frac{\mu L_s}{2}\right)^2-R_pR_sL_sC_s}$$

where $\mu$=effective amplification factor of the oscillator tube
$L_s$=load circuit inductance
$R_s$=effective series-resistance of load circuit
$C_s$=load circuit capacitance
$R_p$=effective anode resistance of the tube and the maximum value of the mutual inductance for which oscillations will continue to be generated is given by $$(3) \qquad M_{max}=\frac{\mu L_s}{2}+\sqrt{\left(\frac{\mu L_s}{2}\right)^2-R_pR_sL_sC_s}$$

These limiting values of mutual inductance are based upon the operating characteristic of prior tuned-grid oscillators when the radio-frequency potential on the grid is substantially equal to that of the grid tank circuit. This equality of potentials exists because the connection between the grid and its tank circuit is either a direct conductive one or is through a blocking condenser having negligible reactance at the operating frequency. With either of these arrangements, the mutual inductance or coupling between the anode circuit and the tuned tank circuit controls the grid-excitation, but the control of the grid-circuit voltage is necessarily limited to an extremely narrow range of relatively low voltages which will not damage the oscillator tube and which are too low for most practical applications of dielectric heating.

The values of mutual inductance which provide safe grid-excitation voltage are confined within two narrow ranges respectively adjacent to, but within, the limits set by Equations 2 and 3 above. With conventional air-core inductances, it is improbable that operation in the region near the maximum limit (Equation 3) can be achieved due to the difficulty of obtaining sufficient coupling or mutual inductance, so that in practice operation is limited to an extremely narrow range of mutual inductance near the minimum value determined by Equation 2. If the mutual inductance is adjusted below this narrow range, oscillations cease—whereas if adjusted above this range, damage to the tube results because of excessive grid-excitation.

With such prior tuned-grid oscillators, the radio-frequency potential of the grid is essentially equal to that of the tuned grid circuit and remains so practically independently of any variations of the effective input capacity of the tube. Consequently, the increased voltage between the heating electrodes occurring with reduction of the power-factor of the loaded applicator causes excessive rise of grid current harmful to the tube: the grid current is excessive not only because the grid voltage swing is increased, but also because for the negative peaks of the increased anode voltage a greater percentage of the filament emission is drawn to the grid.

Thus, tuned-grid oscillators of the prior art have very limited utility as power oscillators because of (1) the low grid-circuit voltage; (2) the very limited range of permissible coupling between anode and grid circuits; and (3) the wide variation of grid current resulting from variations in loading. By way of specific example, a tube having a maximum permissible peak grid voltage of 3,000 volts, when used in a tunnel-oscillator circuit, such as 24B shown in Fig. 12, delivered 148 kilowatts to a tunnel load of low power-factor; the same tube, if used in a conventional tuned-grid oscillator, with the same load circuit resistance $R_s$, would deliver only 1.3 kw. to the load circuit and with all circuit parameters except $R_s$ remaining the same, the maximum power which could be delivered to the load circuit before reaching a condition of erratic oscillation is about 12 kilowatts.

In contrast to the conventional tuned-grid oscillator discussed above, with the preferred oscillator 24B, Fig. 12, the mutual inductance between the power-delivery anode circuit and the power-receiving tunnel or other resonant load circuit may be adjusted to any value in the range between the limits set forth by Equations 2 and 3 and throughout such range the capacitor 59 may be adjusted to provide proper grid-excitation. Furthermore, as previously explained in connection with Equation 1, the increase in effective input capacity $C_t$ (62 of Fig. 12), due to the increase of effective anode load resistance $R_b$ incident to a decrease of work circuit power-factor, is effective to reduce the grid-voltage/electrode-voltage ratio so to minimize the rate of rise of grid current despite the increased swing of the anode voltage.

Furthermore, since the tuned circuit voltage may be many times as high as the safe grid potential, the "stored energy" in the tuned circuit may be many times that obtained in a conventional tuned-grid oscillator lacking the potential-divider 59, 62.

When the tuned circuit is a tunnel tightly coupled, as by loop 51, to the oscillator anode circuit and the grid-excitation is derived through capacity-divider 59, 62 from the tunnel electrode voltage, the high "Q" of the tunnel assures stable operation without danger of frequency-jumping.

Generally, to obtain high electrode voltages suited for heating of low power-factor loads, the anode circuit must be resonant at a frequency above the tunnel frequency, and, as in all cases, the loop 51 must be so connected to provide grid-excitation of the proper phase. The operating frequency of the oscillator cannot jump to that of the anode circuit because at the anode circuit frequency the phase of the plate and grid voltages would be incorrect for generation of oscillations. As previously explained, the series grid-coupling capacitor 59 usually has a high reactance at the oscillator frequency: this capacitive reactance effectively neutralizes the inductive reactance of the grid lead 60 and so minimizes the possibility of parasitic operation in a T. N. T. mode at the anode circuit frequency.

Summarizing, the potential-divider network 59, 62—

(1) Provides operation over a wide range of mutual inductance;

(2) Permits the heating-electrode voltage to be adjusted to values many times the rated grid voltage of the tube, so that load materials having very low power-factor may be heated;

(3) Provides a compensating effect to minimize changes of grid-current occurring with changes of load circuit power-factor;

(4) Enables a tuned grid-circuit to hold more stored energy; and (5) Provides a high capacitive reactance which adequately neutralizes the inductive reactance of the grid lead 60 so to minimize any tendency for parasitic oscillation in a T. N. T. mode.

Fig. 14 shows a family of curves each indicating the variation of heating-electrode voltage with change of the degree of coupling between a resonant applicator and the associated anode circuit of an oscillator. These particular curves are based on calculations of voltage corresponding with measured values of mutual inductance from the tunnel-oscillator of Fig. 25. As shown by each curve, for a particular loaded Q of the applicator, the maximum heating-electrode voltage occurs at a point "O" termed the point of "optimum" coupling at which the effective resistance ($R_b$), reflected into the anode circuit from the loaded resonant applicator, is equal to the effective anode resistance $R_p$. The corresponding "optimum" value $Z_o$ of the coupling impedance at the operating frequency ($f_o$) is given by equation:

$$(4) \qquad Z_0=\sqrt{R_pR_s}$$

where $R_s$=effective series resistance of the applicator.

For inductive coupling, the "optimum" value $Z_o$ of the coupling impedance may therefore be expressed as $$(4A) \qquad \omega L_m=\sqrt{R_pR_s}$$

where $\omega=2\pi f_o$ $L_m$=mutual inductance.

For capacitive coupling, the "optimum" value $Z_o$ of the coupling impedance may be expressed as $$(4B) \qquad \frac{1}{\omega C_m}=\sqrt{R_pR_s}$$

where $C_m$=mutual capacitance.

As later more fully discussed, the coupling, whether inductive or capacitive, should be supraoptimum (i. e., the mutual impedance or coupling impedance should be greater than the square root of the product of $R_p$ times $R_s$) to minimize the change in heating-electrode voltage with change in Q of the loaded applicator.

With a tunnel type of resonant applicator, supraoptimum coupling may be readily obtained since all of the magnetic flux encircling the high-frequency current in the fin inductor must pass through the space provided between the fin and the walls of the tunnel and since the coupling loop 51 may be dimensioned and disposed to intercept a large percentage of the total flux of the applicator. Supraoptimum coupling to a tunnel applicator is in fact obtainable even with a single-turn loop which may be a wide strap, of low inductance, so facilitating satisfaction of the requirement that the anode circuit frequency for many dielectric heating applications must be substantially higher than the resonant frequency of the applicator.

The loop 51 of all inductively coupled tunnel applicators herein shown is preferably of dimensions and disposition insuring that, throughout its range of adjustment (as shown by the full-line portions of the curves of Fig. 14), the mutual inductance between the anode loop and the resonant tunnel applicator affords supraoptimum coupling. It should be noted that with supraoptimum coupling the oscillator loading (the voltage across the electrodes 15B, 16B) is increased by decreasing the coupling and vice versa.

For any given adjustment of the loop throughout most of the "Operating Range" (Fig. 14), the electrode-voltage does not substantially vary with change in the loaded "Q" of the secondary or tunnel circuit as would occur, for example, upon change of the electrical characteristics of dielectric work during its heating or, in a conveyor-fed tunnel, of change in the number of work objects moving between the tunnel electrodes. For example, referring to Fig. 14, it may be assumed that work to be heated normally causes the tunnel to have an apparent power-factor of 0.002 or 0.2% and that an electrode-potential of 15,000 volts is required to heat that work at desired rate. Accordingly, the mutual inductance is set at the corresponding value X, Figs. 14 and 15, prior to or during the early stage of a heating run. Now, should for any reason the apparent power-factor of the tunnel drop to 0.05%, the heating-electrode potential of the tunnel rises only to about 17,200 volts as indicated by "Rise" on the right-hand side of Fig. 14.

This is in marked contrast to the high rise in heating-electrode voltage occurring if, in accord with prior practice, the coupling is adjustable in a range between zero and optimum. In such latter case, the mutual inductance would be adjusted to the value Y (below optimum coupling, Fig. 14) to obtain the required 15,000 volts on the heating electrode: now upon reduction of the apparent power-factor of the secondary circuit to 0.05%, the electrode voltage rises to over 29,000 volts (as indicated by "Rise" on the left-hand side of Fig. 14), an increase in electrode voltage of more than 90 percent.

With the relatively low Q's attainable with conventional dielectric-heating circuits, the voltage rise incident to decreased power-factor of the load, though not this great, is large and is added to by a substantial voltage rise due to the decrease in dielectric constant of the load capacitor which accompanies removal of load. In short, the actual voltage rise due to both of these effects may be greater than the Y—Y rise, Fig. 14.

With the preferred oscillator circuit 24B using supraoptimum coupling, the voltage change incident to change in dielectric constant is opposite in sense to that due to change in power-factor and consequently the actual rise, due to both effects, is less than the X—X rise, Fig. 14. By way of explanation, the decrease in applicator capacitance incident to removal of load causes a decrease in electrode voltage, Fig. 37.

Substantial constancy of the electrode voltage for a selected degree of coupling is of great advantage when, as indicated in Fig. 12, the objects 19 to be dielectrically heated are carried through the tunnel applicator by a conveyor belt 63, or equivalent, because the apparent power-factor of the applicator may vary from a very low value corresponding with the power-factor of the lightly loaded applicator, which may be as low as 0.02% to a substantially higher value corresponding with the power-factor of the heavily loaded applicator, which may be 1.0%, a range of variation of 50 to 1. Otherwise stated, at times the conveyor 63 may be practically covered with work objects whereas at other times there may be only a few objects, or none, between the applicator heating electrodes. Both the number and size of the work objects and the power-factor of the work material as disposed between the heating electrodes determine the apparent power-factor of the loaded tunnel applicator for any given electrode spacing. With the preferred form of the present invention, including supraoptimum coupling, there is essentially uniform heating of the work regardless of the work density.

With the plate loop 51 pre-adjusted to provide the desired heating-electrode voltage, when both the potential-divider and supraoptimum coupling are incorporated, the grid-current remains essentially constant over a wide range of effective power-factor of the applicator so to obtain safe and efficient operation of the oscillator tube as well as safe and uniform heating of the work.

When the work is of higher power-factor, such as above 2% and of area comparable to the electrode area, the electrode spacing should be adjusted to provide an air gap above the work so to decrease the apparent power-factor of the tunnel applicator. Otherwise, the power-factor of the heavily loaded applicator might, in extreme cases, be so high that the anode current could not be reduced by adjustment of the loop 51 to a safe value.

Without the potential-divider arrangement 59, 62, the oscillator circuit 24B of Fig. 12 cannot safely operate with supraoptimum coupling and high heating electrode voltage because the grid-excitation would be excessive and would damage the tube. The potential-divider arrangement is of utility even without the supraoptimum coupling feature. Supraoptimum coupling may be used to advantage, without the potential-divider, with other types of oscillator circuits such as the T. N. T. circuit previously described. Either of these features has marked advantages when used separately as discussed above, and, when combined to form the preferred oscillator 24B of Fig. 12, are of particular utility to facilitate adjustment for a desired heating rate and to provide automatic protection against the effects of large changes in power-factor of the applicator as occur during adjustment of the oscillator loading as by variation of the air gap or during heating of work.

A most advantageous embodiment of the present invention includes the features of deriving the grid-excitation from the heating electrode voltage by a potential-divider, supraoptimum coupling and change of coupling concurrently with change in electrode spacing. In the particular applicator shown in Fig. 11, the change in coupling with change in electrode spacing is obtained by employing a bowed flexible fin structure 13A. Lowering the electrode 16B from the dotted line position increases the capacity which, as shown in Fig. 37, causes the electrode voltage to rise. However, as the electrode 16B is lowered toward the full-line position, the fin 13A approaches the loop 51 and so increases the mutual inductance and therefore the coupling impedance between the anode and tunnel circuits. As indicated in Fig. 14, with the coupling in the supraoptimum range, an increase of mutual inductance reduces the electrode voltage. Thus, the two effects incident to change in spacing between the electrodes are compensatory and tend to hold the electrode voltage constant.

This compensation of the variation of electrode spacing by a concurrent variation of coupling, the stabilizing effect of supraoptimum coupling upon the electrode voltage and the automatic grid-excitation compensation obtained by use of the capacity-divider arrangement previously discussed all mutually cooperate to stabilize the dielectric-heating operation. Such stabilizing action does not occur with conventional oscillator circuits.

The bowed fin structure, Fig. 11, or equivalent arrangement, in conjunction with supraoptimum coupling, is also of advantage when used in oscillators not having a capacity-divider 59, 62 as in the preferred circuit of 24B. For example, in the T. N. T. circuit of Fig. 11, this combination will tend to hold the electrode voltage essentially constant but manual or automatic control of the grid current should be provided.

In the oscillator-tunnel arrangement shown in Fig. 16, the tunnel applicator 11E may be of any of the forms herein disclosed, but the oscillator circuit 24D is of a type different from those previously herein described and solves a grid-excitation problem early encountered in tunnel-oscillators. In T. N. T. oscillator circuits 24, such as shown in Figs. 7 and 11, particularly with tubes having large effective input capacities, the grid inductor 26 required for generation of higher frequencies of the aforesaid range (5 to 50 megacycles) is very small, in some cases a short strap. Therefore it has been difficult to adjust the grid circuit, as is necessary, to a frequency somewhat higher than the desired operating frequency of the oscillator. This difficulty is overcome in circuit 24D (Fig. 16) by addition of a series tuning condenser 72 which for the same operating frequency permits the grid inductance 26 to be substantially increased in physical size. Instead of being a short strap as heretofore, the grid inductance 26 may be of substantial length and of adjustable U-shape, as in the form of a "trombone." Either the inductance 26 or the condenser 72, or both, may be varied to control the magnitude of the grid voltage or current for proper excitation.

With the oscillator circuit 24D as used in a tunnel-oscillator circuit, supraoptimum coupling of the anode coil 51 to the tunnel, as discussed in connection with Fig. 14, preferably should be used to minimize variation of the voltage of the heating electrode 16B with changes in effective power-factor of the tunnel.

When, as in Fig. 16, for example, the anode end of the loop 51 enters the tunnel near the grounded end of the fin 13A and the opposite end of the loop leaves or is connected to the tunnel nearer the "hot" electrode end of the fin, the potential of the "hot" electrode is approximately 180° out of phase with respect to the anode potential and is usable for grid-excitation through a grid-condenser as schematically shown in Fig. 12. However, the heating electrode voltage may, for high-power, high-"Q" tunnels, be above the breakdown voltage of commercially available condensers having the required high current rating. In such case, the oscillator circuit may be of the T. N. T. type shown in Fig. 16. In such circuit the coupling coil 51 may be reversed, as shown in Fig. 17, so that it is in part formed by the tunnel wall. This provides closer coupling between the tunnel applicator and the anode circuit and also increases the frequency of the anode circuit. The coupling between the loop 51 and the tunnel applicator may be reduced to increase the anode circuit loading by adjustment of the shorting bar 67 of Fig. 16 or of a strap 74 of Fig. 17 connected at one end along the tunnel fin 13B and at the other end along the adjacent side of the loop. In its simplest form, the anode loop may comprise a single conductor extending to a suitable tap point on the fin 13B, the other sides of the loop being formed by that part of the fin extending from the tap to the wall structure and by that part of the wall structure extending from the junction of the wall structure and the fin to the cathode condenser 61.

As in Fig. 16, the grid coil 26 may be of unusually large value, facilitating adjustment for operation at desired high frequency by the series tuning condenser 72.

When for any reason it is not feasible to place the work within the tunnel applicator, the applicator may be coupled to an external work circuit as shown in Fig. 18. There is negligible coupling between the anode loop 51 and the external work circuit in absence of a magnetic or electric flux in the tunnel 11L which can exist only when the tunnel is excited at or near its resonant frequency. With the work circuit coupled to the oscillator tune only through the intermediary of a high-"Q" tunnel applicator, there is avoided any possibility of the frequency of the oscillator jumping during heating of the work, or during adjustment of the work-circuit to draw load, to a frequency other than the one to which the tunnel applicator is resonant.

Specifically, the work-coupling loop 83 is disposed within the tunnel 11L to one side of fin 13B, the anode loop 51 being on the other side of the fin. Thus, there is essentially no direct coupling between loops 51 and 83 and the only coupling to the load circuit is that afforded by the magnetic field encircling the fin 13B and whose frequency is rigidly stabilized throughout a wide range of loading by the inductance of the tunnel fin and the capacitance between tunnel electrodes 15B, 16B. The external work-circuit including the heating electrodes 85, 86 may be adjusted by a series tuning inductance 87 for low capacity between heating electrodes 85, 86: for unusually high capacity between the heating electrodes 85, 86, there may be additionally provided a shunt inductance 88. In neither case will the loading adjustments have any appreciable effect upon the frequency of the generated oscillations. The potential difference between the external heating electrodes 85, 86 may be adjusted to desired value by adjustment of the mutual inductance of loop 83 and the tunnel: for example, the loop 83 may be rotated to different angular positions for which different magnitudes of the tunnel flux traverses the loop area. This adjustment does not cause the oscillator to jump to a frequency for which there is little or no transfer of high-frequency power to the work-circuit. In short, the oscillator is rigidly stabilized by the tunnel.

Alternatively, or in addition, the tunnel 11L may provide for capacitive coupling to an external work-circuit. Specifically, a work-coupling plate or electrode 89 is disposed within tunnel 11L between the two electrodes 15B, 16B of the tunnel for capacitive connection to the "hot" work electrode 86A so to provide a high-potential voltage-divider. When required because of large capacity between heating electrodes 85A, 86A, a shunt inductance 88A may be utilized to increase the capacitive reactance of the external work-circuit. Again, as with the inductive work-coupling arrangement, there is no possibility that adjustments or changes in the external work-circuit will cause the oscillator to jump to a frequency for which it will not supply appreciable power to the work-circuit. The power transferred to the external work-circuit may be adjusted by loop 83 or electrode 89.

The tunnel applicator of Fig. 18 may also be used for heating of work placed in or movable through the space between electrode 89 and the upper electrode 16B, the space between electrode 89 and the lower electrode 15B, or both spaces.

In the modification shown in Fig. 19, the fin structure 13C is made hollow to form a shielded or field-free compartment 64C for the oscillator tube and associated circuit components. In the particular oscillator circuit 24C shown in this figure, the grid-excitation is provided by a second loop 71 which extends into the tunnel space on the side of the fin structure 13C opposite from the anode coupling loop 51. The loops 51, 71 are so poled or connected that the induced grid voltage is of proper phase for generation of oscillations.

In Fig. 19, as in Fig. 22, later described, a load tray may be provided for insertion and removal of the work 19, the electrode 16G being at convenient height for manual loading of plastic preforms or the like; or a conveyor moving along or above the upper surface of electrode 16G may transport work through the work space, the adjacent top wall of the enclosure 11I serving as the "cold" electrode 15E. For other uses, the unit may be inverted as also may be many of the other tunnel applicators herein disclosed.

The fin inductance structure of the tunnel applicator need not be symmetrically located; it may be offset, as in Fig. 20, to afford space in the tunnel enclosure which may be used for housing of the oscillator tube and its associated components. It is necessary effectively to isolate such oscillator elements from the tunnel flux and to provide an adequate space or path for the high-frequency magnetic flux of the tunnel to encircle the fin. Specifically, the fin 13B of tunnel 11G is offset from center to accommodate the shielding enclosure 64 for housing of the oscillator tube 25 and associated circuit components. The loop 51 extends from the housing 64 into the aforesaid flux path so to couple the tunnel applicator to the anode circuit of the tube. The degree of coupling may be varied, as by swinging the loop about the axis of insulated shaft 65 extending to control knob 66 which is accessible externally of the tunnel. In Fig. 12 the corresponding control knob 66 is adjacent the front of the tunnel and coupled by a sprocket and chain arrangement to the actuating shaft 65 which is grounded at the point of exit through the lower wall of the tunnel.

The metal housing 64 (Fig. 20) may also serve as a baffle, increasing the flux density and therefore the mutual inductance obtained for a given size of coupling loop. Shutters or baffles may be added for that purpose and the degree of coupling may be varied by adjustment of these shutters in lieu of or in addition to rotation of loop 51.

Preferably, for reasons above stated in general discussion of Fig. 12, the grid-excitation for the oscillator of Fig. 20 is derived from the electrode voltage of the tunnel by a capacitor voltage-divider 59, 62. Work 19C of small height may be heated by disposition below electrode 16E and tall work 19D heated by disposition to the left of fin 13B and in the lower part of the tunnel. With this construction, work objects of different height may be heated without raising or lowering of the tunnel electrode 16E, or two different sizes of work may be concurrently heated.

When, however, it is desired simultaneously to accommodate work pieces of two substantially different heights in the same tunnel, it is more desirable that one heating electrode, as in Fig. 21, have two surfaces parallel to the other heating electrode of the tunnel, but with different spacings therefrom. Specifically, the fin 13B of tunnel 11H has a "hot" electrode 16E extending in one direction from its lower end and a higher "hot" electrode 16F extending therefrom in opposite direction. As in Fig. 20, both short and tall work pieces may be manually inserted and removed or may be fed through the tunnel by conveyor means, preferably separate conveyors for the low and high work pieces 19C, 19D.

Fig. 21 also shows an alternative arrangement, usable in any of the other tunnel applicators, for varying the mutual inductance of the tube and tunnel circuits: specifically, the coupling may be reduced by moving the shorting bar 67 away from the closed end of the fixed loop 51.

There are now briefly described two tunnel applicators suited for pre-heating of preforms of thermoplastic or thermosetting materials which are of much higher power-factor than gum rubber, for example. For such purposes, the high-frequency power requirements are fairly low, for example, 2 to 5 kilowatts, and the tunnel structure may, as in Fig. 22, be somewhat modified for incorporation in a self-contained mobile unit.

The tunnel applicator of Fig. 22 is similar to that of Fig. 20 in that the oscillator tube 25 and associated oscillator-circuit components including blower 68 may be disposed in a shielded compartment 64A within the tunnel enclosure. Other compartments 69A, 69B within the tunnel enclosure may also be provided for meters, control relays and other power equipment to complete a self-contained unit suited for heating of plastic preforms 19, and like uses, requiring powers of the order of a few kilowatts. As shown, all compartments are located to leave a free path for high-frequency flux to encircle the tunnel fin structure 13D which in this modification is a metallic column, preferably hollow, which extends from the bottom wall of the tunnel with the "hot" electrode 16F at its upper end so that the top of the tunnel may serve as the associated "cold" electrode 15E. Alternatively, an upper adjustable electrode (not shown) connected to the top wall of the unit may serve as a cooperating electrode which may be raised or lowered to accommodate preforms of different height or to vary the effective power-factor of the loaded tunnel and so vary, as previously discussed, the load reflected into the anode circuit of the tube. The work tray 70 for insertion and removal of the preforms, or other work, is preferably a thin sheet of low power-factor insulating material, such as glass or of glass fibre-board impregnated with silicone resin, fastened to a door or panel 53A which completes the tunnel enclosure when the work tray is inserted. Tray 70 may simply slide upon and be supported by the "hot" electrode 16F and may be wholly retractable from the tunnel for loading or removal of work. The power supply side of loop 51 is effectively grounded by the by-pass condenser 36.

Because of ability of the tunnel-oscillator to deliver power into the work throughout a wide range of effective load-circuit power-factors, with a preform heater of this type, the heating cycle may be substantially shortened in correspondence with reduction in number of preforms on the tray for heating. With such tunnel-oscillator preheater, the electrode voltage may be raised to dissipate full power in fewer and fewer preforms without unduly increasing the circuit-losses or jumping of frequency.

The tunnel applicator 11K shown in Fig. 23 is also for heating of dielectric preforms or other small work objects. The tunnel is L-shaped with the higher fin-enclosing portion adjacent to or received by the cabinet 36, which houses the oscillator tube and other components of the oscillator system. The coupling loop 51 within the tunnel is provided with a connection extending through the rear wall of the tunnel for connection to the anode of the oscillator tube, as shown in prior figures. The "hot" electrode at the lower end of the tunnel-fin 13B may be supported by insulators 37 extending upwardly from the bottom tunnel wall. Such support of the "hot" electrode permits the fin 13B to be of relatively thin sheet metal without possibility of change in its position with respect to loop 51 when work is placed upon or removed from the "hot" electrode 16B.

The "cold" electrode 15D is attached, as by insulators 38, to the under side of the cover 55B for the front, lower part of the tunnel and is connected to a stationary part of the tunnel by a conductive strap 39. The high resistance of the hinge connection of the cover is thus excluded from the path of the tunnel current. Interlock switches (not shown) deenergize the oscillator when cover 55B is raised for insertion or removal of work 19 from the front portion of the "hot" electrode 16B.

Because of its exceptional performance in dielectric heating of low power-factor loads, the tunnel applicator is well suited for efficient heating or drying spool or bolt-wound materials including cotton, rayon, nylon and the like. Referring to Fig. 24, the thread, tape, web or other strip material 19B is fed from one or more supply rolls 76 through the interelectrode heating space of tunnel 11E to one or more receiving rolls 77. For enhanced length of travel in the high-frequency electric field between the tunnel electrodes, the material 19B is threaded back and forth between rollers 78 which are supported from the under face of the electrode 16B, and the rollers 79 which are supported from the upper face of the bottom wall of the tunnel. In such arrangement, the rollers serve as heating electrodes.

In Figs. 25 to 28 is shown the detailed construction of a metal reentrant cavity or tunnel applicator: in Fig. 30, the same tunnel is schematically shown as the frequency-determining circuit of the preferred type of self-excited oscillator discussed at length in connection with Fig. 12. The internal dimensions of the particular tunnel 11M, shown in Fig. 25, are approximately 3 feet high and 4½ x 5 feet for width and length, the tunnel walls being of sheet aluminum with flanges 47A forming frame or stiffening members. The fin 13E, in major part, comprises a vertical series of long narrow sheets 90 of copper or beryllium-copper each joined at its opposite long edges to an adjacent sheet, as by copper binder strips 91 and rivets 92, Fig. 26, so to form a fin having accordion-like folds which are extensible and collapsible for adjustment of the spacing between the tunnel electrodes 15G, 16H. The lower edge of the lowermost fin strip 90 is attached to the "hot" electrode 16H by the rigid fin member 93 extending upwardly from the upper face of that electrode. The upper edge of the top fin strip 90 is attached to the aluminum frame member 94 which serves both as the top element of the fin and as a brace for the top panel of the tunnel.

The movable heating electrode 16H is formed of sheet aluminum, and is approximately 4 feet x 4 feet, with the edges curved upwardly and back in prevention of corona. The "hot" electrode 16H is supported from the top of the tunnel by an arrangement of telescoping tubes 95, 96. Each of the tubes or rods 96 is mechanically attached to electrode 16H by a stand-off insulator 97 provided with shields 98, 99. The spring fingers 100 bond the rods 96 to the associated tubes 95 to prevent arcing and burning at these points of sliding contact. The rods 96 are mechanically connected within tubes 95, or externally of the tunnel, to a driving mechanism (not shown) for raising or lowering of the hot electrode 16H to space it from the work or to engage the work with pressure within the capabilities of the mechanism.

Contrary to experience with non-tunnel applicators, it was found that the electrode voltage was higher the higher the tunnel capacitance (see Fig. 37). Accordingly the tunnel 11M is provided with supplemental electrodes 101, 102, 103 (Figs. 25 and 27) supported from the upper face of the movable heating electrode 16H by the wide metal brackets or straps 104 which also provide capacity areas not used for heating. It should be noted these supplemental plates or electrodes are so disposed as to leave a clear path about the fin 13E for circulation of its high-frequency magnetic field. A similar arrangement of supplemental capacity areas may be used in any of the other tunnel applicators herein shown to obtain enhanced voltage of the heating electrodes.

Figure 31:
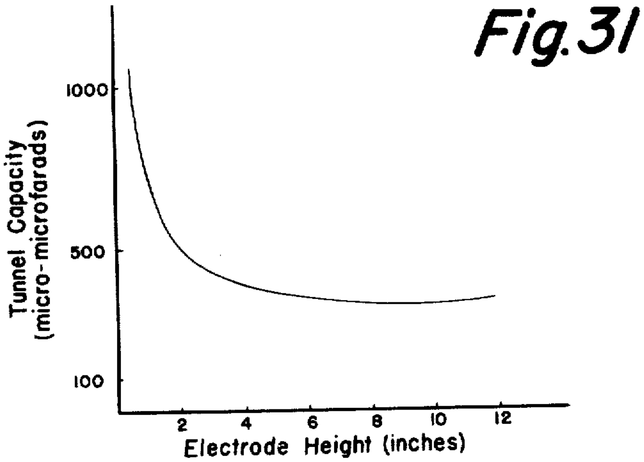

In the particular tunnel, Fig. 25, the capacitance of the unloaded tunnel for various adjustments of the movable electrode structure varies in accordance with the curve shown in Fig. 31. As there indicated by the substantially horizontal portion of the curve, the effect of the supplemental plates or electrodes is to maintain a high and substantially constant value of tunnel capacitance throughout the operating range which, in practice, is upwards of two inches. It is to be noted the capacitance values are unusually high for dielectric heating in the frequency range of about 11 to 24 megacycles over which this tunnel, in practice, operates, Fig. 32.

The curves "Plate Loop Open" (Figs. 32 and 33) are based upon measurements made with the electrical connection between the loop sections 51A, 51B (Fig. 28) broken by temporary removal of the bearing 117 and insertion of an insulating spacer. These curves respectively closely correspond with the self-resonant frequency and the self-inductance of the tunnel applicator.

Figure 33:
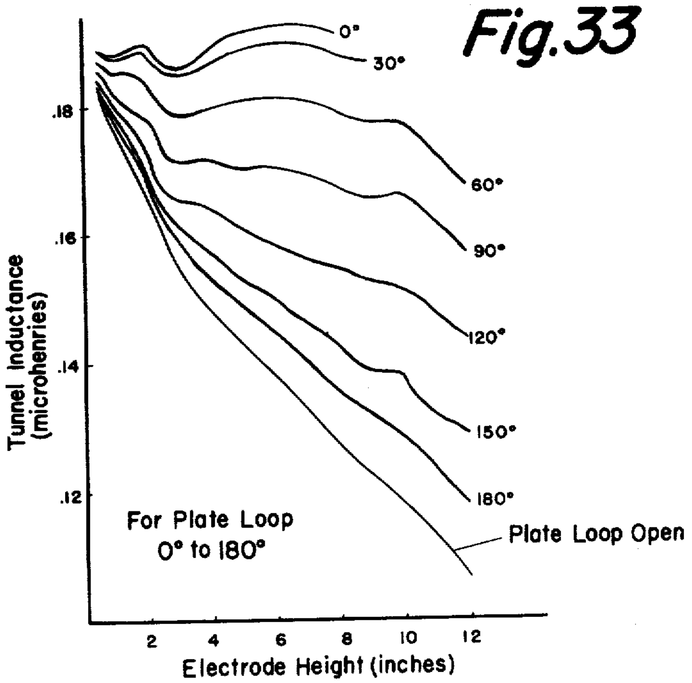
Figure 38:
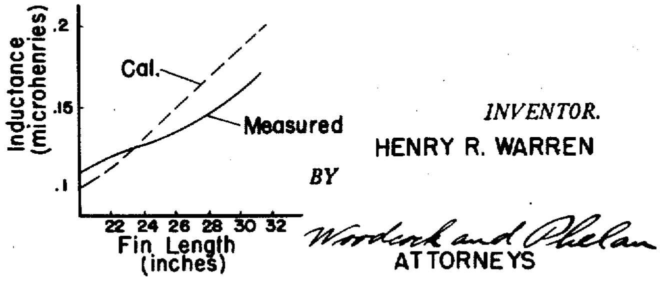

The adjustment of the electrode height also changes the effective length of the fin 13E and therefore changes the inductance of the tunnel, Fig. 38, with cumulative effect upon the tunnel frequency: the relations between the electrode height and tunnel inductance for different settings of the coupling loop 51 are shown in Fig. 33.

Connection from the movable tunnel electrode to the grid of the oscillator tube, Fig. 25, is afforded by the wide strap 60A of copper sheeting attached between supplemental electrode 101 and the rigid conductor 60B, the latter extending through the insulating panel 105 covering a window in a side wall of the tunnel for connection to the potential-divider condenser 59, Fig. 30.

The loop for coupling the tunnel to the anode circuit of the oscillator tube comprises an upper stationary portion 51A supported from the roof of the tunnel as by insulators 106, Fig. 25. The lower portion 51B of the loop is pivoted for rotation through an arc of 180° from the maximum area or zero degrees setting shown in Figs. 28 and 30 so to reduce the effective loop area and therefore the mutual inductance of the anode and tunnel circuits, Fig. 15.

The problem of supplying liquid, as water, for cooling of the oscillator anode without danger of high-frequency flash-over was solved without recourse to choke coils by incorporating the pipes 107, 108 (Fig. 28), for supplying water or other coolant to the tube-jacket 109, in the coupling loop so that the pump end sections of these pipes and the coolant therein are at ground potential and so that the tube end sections thereof and the coolant therein are at the same radio-frequency potential as the anode of the tube. The intermediate sections of pipes 107, 108 attached to and conforming with the wide copper strap 110 serve as corona shields and the coolant therein is effective to prevent overheating of this portion of the loop. To avoid need for leakproof rotary joints in the cooling system, as would be necessary if pipes 107, 108 were incorporated in the rotatable series-loop element 51B, the pipe sections in the vertical, right-hand side of stationary loop member 51A are offset from the axis of rotation of rotatable loop member 51B and the lower horizontal sections of the pipes extend therefrom directly to the tunnel wall. The inner bearing 117 of the rotatable loop member 51B is cooled by shaping at least one of the pipes 108 to partially surround the bearing and contact-fingers 118: the outer bearing, at the tunnel wall, may be similarly cooled. With this construction, the lower horizontal sections of piping 107, 108 from the inner vertical portion of loop member 51A to the tunnel wall should be of glass or other good insulation and the coolant should be of low electrical conductivity.

Another solution of the problem of supplying liquid, such as water, for cooling of the oscillator anode without danger of high-frequency flashover and without recourse to choke coils or to use of insulated piping and distilled water is shown in Fig. 29. The pipes 107, 108 within the tunnel are attached to and conform with the shape of the wide copper strap 110 and serve both to prevent corona and overheating of the strap. The anode ends of pipes 107, 108 are electrically insulated from the tunnel by their passage through the sheet of insulation 105 and the opposite ends of the pipes, which in this arrangement are metallic throughout, are grounded to the tunnel wall. The tunnel coupling loop is a composite one including a stationary loop formed by the piping and strap 110 and a shunt swinging link 51C for varying the coupling between the tunnel and the anode circuit of the oscillator tube. The setting or position of shunt loop 51C shown in Fig. 29 closely corresponds with maximum coupling. The adjustment of link 51C may be effected through a cord, drum and pulley arrangement (111, 112, 113) for the most part disposed between the metal plates 114, 115 on opposite sides of the lower horizontal run of pipes 107, 108. The shaft of drum 112 extends externally of the tunnel for drive by motor 116 or other actuating means.

Figure 34:
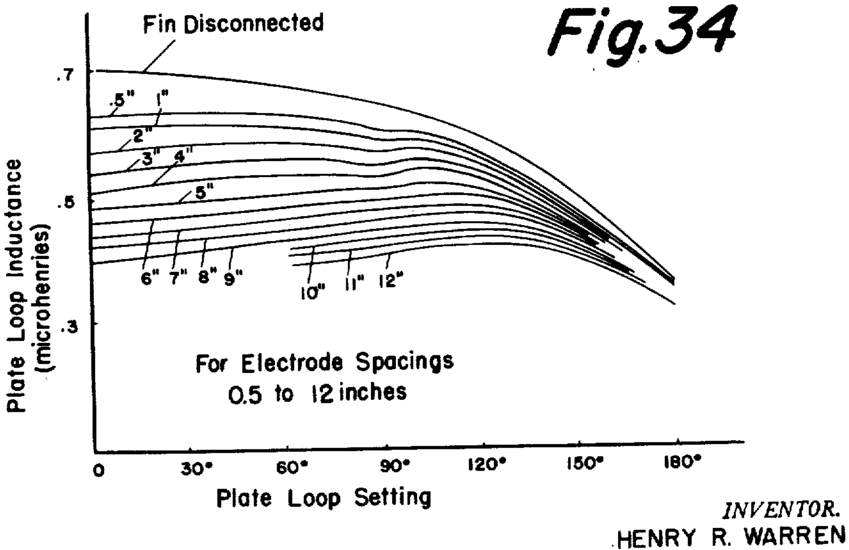

In the tunnel of Fig. 25, the mutual inductance between the tunnel and anode circuit is adjustable in accordance with Fig. 15 over a range of from 0.04 to 0.11 microhenry which affords supraoptimum coupling (Operating Range, Fig. 14) for all adjustments of swinging link 51B of Fig. 28. The variation of the self-inductance of the loop for various positions of its rotatable portion and for different heights of the movable electrode is shown in Fig. 34. The curves "Fin Disconnected," (Figs. 34 and 35) are based upon measurements made with the rigid fin member 93 electrically disconnected from but mechanically fastened to the lowermost element 90 (Fig. 25) of the flexible fin structure.

Figure 32:
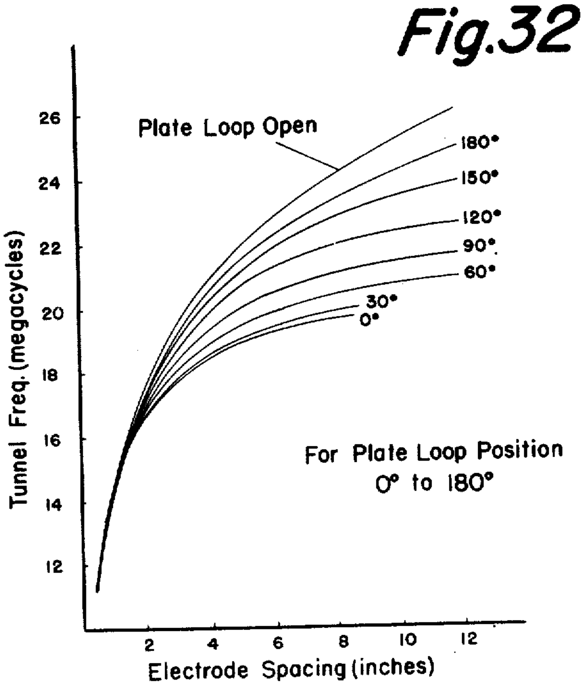
Figure 35:
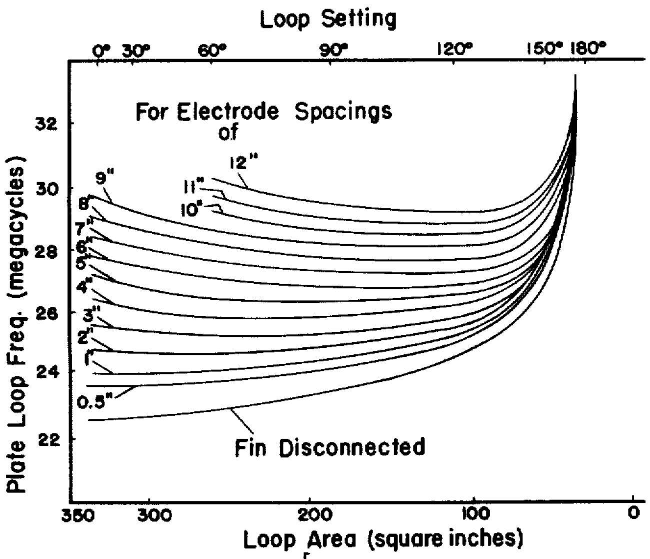

As evident from comparison of Figs. 32 and 35, the resonant frequency of the anode circuit loop and associated capacitance including that of the oscillator tube which may be a Machlett 5619 is substantially higher, for all settings of the loop and of the electrode height, than the frequency of the high-Q tunnel.

Figure 36:
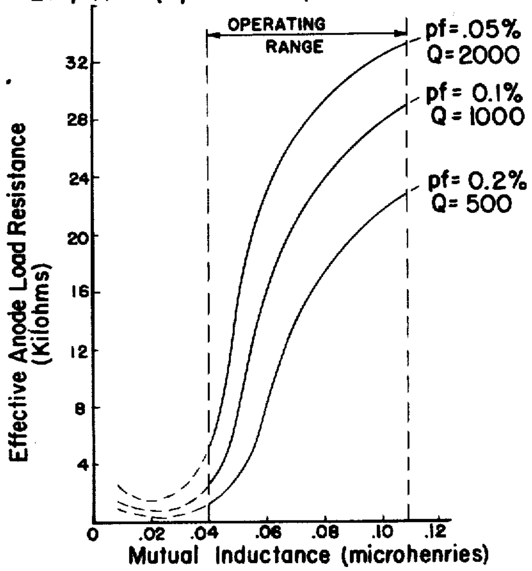

For means previously above discussed, the tunnel-oscillator frequency throughout the range of the loading adjustments exhibits no tendency to jump to the resonant frequency of the anode loop circuit. With the aforesaid tube, the tunnel of Fig. 25 supplies up to about 15 kilowatts of high-frequency power to the work. The relationship between the mutual inductance of the anode circuit and tunnel applicator and the resistance reflected into the anode circuit for specified power-factors of the tunnel 11M and its load is shown in Fig. 36.

In all circuits, as shown in simple schematic form, the meters for measuring the operating voltages and currents, the associated power supplies and relay systems have all been omitted for clarity.

In résumé, some of the principal advantages of the tunnel type of resonant applicator are that:

(1) It makes commercially possible the heating of materials having extremely low power-factors as well as materials having higher power-factors;

(2) It makes possible the use, at high frequencies, of heating electrodes of unusually large area without need for stubbing and attains enhanced electrode voltages with such large heating electrodes;

(3) The need for transferring pressure through insulators in a dielectric heating press is eliminated;

(4) It makes possible, particularly when forming the frequency-determining circuit of an oscillator, supraoptimum coupling to the oscillator anode circuit which provides substantial constancy of the electrode voltage despite varying power-factor of the work and permits adjustment of the electrode voltage over a wide range to obtain efficient heating of work materials of widely different power-factors; and (5) In an oscillator, the presence of potential-divider coupling from the oscillator grid to the tunnel applicator, voltage-stabilized as above, maintains essentially constant grid-current throughout the range of maximum to minimum loading of the tunnel by the work.

The terms "tunnel" and "tunnel applicator" are used herein for brevity to designate certain preferred forms of devices to which the present invention relates, more particularly reentrant resonators or self-shielding circuit devices comprising an electrically conductive enclosure having therein inductance structure including at least one inductive element, which may be in the form of an inductive leg or fin structure, projecting into the interior of said enclosure, and also having spaced electrode structures cooperative to provide electric field space within said enclosure, one of which electrode structures is electrically connected to and disposed at the inwardly projecting end of said inductive element in spaced relation to the walls of the enclosure and is electrically connected with a portion of the wall structure of the enclosure through said inductive element, said wall structure providing a low-resistance, low-reactance path completing a resonant circuit including said inductive structure and said electrode structures and the frequency of which is predominantly determined by the inductance of said inductive structure and the capacitance between said electrode structures, and said enclosure serving as a shield to confine said electric field and also the magnetic field which encircles said inductive structure. In accordance with certain features of the present invention, the dimensions of such tunnel or tunnel applicator, including those of the inductive fin, the electrode structures and their interconnections, and the positions of the interconnections, may be made such that at the operating frequency there can be no possibility of existence of standing waves, or substantial voltage gradients along the electrode structures in the applicator.

More particularly, this can be accomplished by making at least one face dimension of the electrode structures very much smaller than a wavelength and by elongating the inductive fin structure in the other direction so that in said last mentioned direction the dimension of the fin structure is very close to, or equal to, the dimension of the electrode. Still more particularly, the half-width of the electrode should be substantially less than ⅛ wavelength and, in the case of an elongated electrode, its projections, if any, beyond the elongated fin should be substantially less than ⅛ wavelength in the direction of elongation.

From the foregoing, it will be seen that "tunnels" or "tunnel applicators" characteristically differ from (1) Waveguides which are inherently characterized by presence of standing waves and by high attenuation of all frequencies below critical cut-off frequency;

(2) Concentric line sections which are of length characterized by presence of standing waves unless terminated by resistance equal to the characteristic impedance of the line; and (3) Ordinary resonant cavities which are characterized by the presence of standing waves and are operable only at discrete frequencies determined both by their dimensions and geometry.

Various features herein illustrated and described but not claimed are claimed in my copending applications Serial Nos. 419,070, 419,071, 419,072, 419,073 and 419,074, all filed March 26. 1954.

For brevity in the appended claims, the term "supraoptimum" as used in connection with the coupling, inductive or capacitive, between the anode circuit and the load circuit shall be understood to mean a value of coupling impedance greater than the square root of the product of the effective anode resistance times the effective series resistance of the load circuit.

What is claimed is:

1. A dielectric heating system comprising a high-frequency source of supply having a power-delivery circuit for supplying radio-frequency power to a dielectric workload disposed between heating electrodes, a metal reentrant cavity having metallic fin structure internally extending from one wall of said cavity and spaced from the remainder thereof to provide the lumped inductance of said cavity and having electrode structure electrically connected to said fin structure in spaced relation to all walls to provide lumped capacitance resonating said lumped inductance, and a loop traversed by the magnetic field encircling said fin structure and dimensioned to provide supraoptimum mutual inductance between said delivery circuit and said cavity to insure substantial constancy of the high-frequency potential of said electrode structure despite large variations in power-factor of work being dielectrically heated, the inductance of said cavity-fin structure and the capacity of said cavity-electrode structure defining a resonant circuit predominantly determining the operating frequency of said source.

2. The heating system of claim 1 in which at least part of said electrode structure of the cavity is one of the work-heating electrodes.

3. The heating system of claim 1 in which there is provided at least one device for applying pressure to work being dielectrically heated in the cavity and in which at least a part of the fin structure and the attached electrode structure of the cavity are movable by said device for transmittal of pressure to the work.

4. The heating system of claim 1 in which at least part of said electrode structure of the cavity is one of the work-heating electrodes and in which the metallic fin structure is extensible concurrently to change said inductance and said capacitance and to change the voltage gradient through the work.

5. The heating system of claim 1 in which conveyor structure extends through the cavity to transport the work between said cavity-electrode structure and wall structure of the cavity in a path exclusive of said cavity space encircling the fin structure, the supraoptimum mutual inductance precluding substantial change of the radio-frequency potential of said electrode structure despite large variations of the work distribution on said conveyor.

6. The heating system of claim 1 in which said source includes an oscillator tube and in which a load-compensated grid-excitation voltage for said oscillator tube is derived from the cavity by a potential-divider, said potential-divider comprising capacitance means connected from said cavity electrode to the control grid of said tube and in series with the substantially larger effective input capacity of said tube, which latter increases and decreases automatically, in compensatory sense with changes in load.

7. In a system comprising an oscillator tube for generating radio-frequency power for dielectrically heating work, the combination of a metal reentrant cavity having metallic fin structure internally extending from one wall and spaced from the remainder thereof and having internal electrode structure electrically connected to said fin structure and disposed in spaced relation to all cavity walls, a loop in the anode circuit of said tube and disposed in the cavity space which encircles said fin structure for transfer from said tube to said work of radio-frequency power, means for adjusting the mutual inductance between said anode circuit and said cavity over a range which throughout is supraoptimum, and a potential-divider comprising capacitance connected from said cavity-electrode structure to the grid of said tube and capacitance between the grid and cathode of said tube, the inductance of said cavity-fin structure and the capacity of said cavity-electrode structure determining the frequency of the generated power, and said capacitance potential-divider automatically regulating the radio-frequency potential of said grid to maintain substantial constancy of the grid-excitation despite substantial variations in power-factor of the work.

8. A high-frequency electric heating system comprising a load circuit which has a high unloaded Q and which is subject to wide variation in voltage with variation in loading, means for supplying radio-frequency power to said circuit including an oscillator tube having effective grid-cathode capacity which varies with such variation in loading, and potential-divider means connected to said load circuit so as to derive therefrom a grid-excitation voltage which becomes a progressively smaller fraction of the load circuit voltage as the latter increases with variation of loading and a progressively larger fraction of the load circuit voltage as the latter decreases with variation of loading, thereby to effect substantial stabilization of the grid-excitation voltage, said potential-divider means comprising capacitance means in series with said effective grid-cathode capacity of the tube, the capacity of which capacitance means is substantially less than said effective grid-cathode capacity, and said effective grid-cathode capacity at most having only relatively small capacity in shunt thereto.

9. A system for high-frequency electric heating of dielectric material, comprising a resonant applicator including electrodes supported in spaced relationship for receiving such material therebetween and inductance structure electrically connected at one end to, and extending away from, one of said electrodes, said applicator also including conductive structure electrically interconnecting the other end of said inductance structure with the other of said electrodes, said inductance structure cooperating with capacity-means including said electrodes to provide a resonant circuit, a power oscillator of which said resonant applicator forms a part and including an oscillator tube having effective input capacity which varies with variation in loading between said electrodes, means for deriving from said applicator a potential which varies in accordance with variation in voltage between said electrodes, and a potential-divider upon which said derived potential is impressed, which potential-divider includes capacitance means in series with said effective input capacity and cooperative therewith to provide across said effective input capacity a grid-excitation voltage which varies in compensatory sense with such variation in loading.

10. A system as defined in claim 9 wherein the reactance of said capacitance means is substantially greater than the reactance of said effective input capacity.

11. In a system for high-frequency electric heating of dielectric material, a resonant applicator including an electrode-inductance assembly comprising an electrode structure and an inductance structure electrically connected at one end to said electrode structure and extending away from the latter, said applicator also including a second electrode structure supported in spaced relation to said first-mentioned electrode structure for accommodation of material therebetween and conductive wall structure forming a housing enclosing said inductance structure and the space between said electrode structures, means including said conductive wall structure electrically interconnecting the other end of said inductance structure with said second electrode structure, said inductance structure cooperating with capacity-means including said electrode structures to provide a resonant circuit, a high-frequency power oscillator of which said applicator forms a part and including also an oscillator tube having effective input capacity which varies with variation in loading between said electrodes, and means electrically interconnecting the grid of said tube with said electrode-inductance assembly and including capacity-means in series with the effective input capacity of said tube, said capacity-means and said effective input capacity forming a potential-divider which provides across said input capacity a grid-excitation voltage which varies in compensatory sense with such variation in loading.

12. A high-frequency heating system comprising an oscillator tube having an anode output circuit for supplying radio-frequency power for dielectrically heating work, a metal reentrant cavity having metallic fin structure internally extending from one wall and spaced from the remainder thereof and having internal electrode structure attached to said fin structure in spaced relation to all cavity walls, said reentrant cavity forming a power-receiving load circuit, a loop in said anode circuit of said tube and disposed in the cavity space which encircles said fin structure for magnetically coupling said circuits for transfer from said tube to said work of radio-frequency power, means for adjusting said coupling to obtain the electrode potential required for dielectric heating of a given work-load, and a potential-divider comprising a variable capacitor connected from said cavity-electrode structure to the grid of said tube and capacitance between the grid and cathode of said tube, the inductance of said cavity-fin structure and the capacity of said cavity-electrode structure determining the frequency of the generated power and said capacitance potential-divider automatically regulating the radio-frequency potential of said grid to maintain substantial constancy of the grid-excitation despite substantial variations in power-factor of the work, said variable capacitor of the capacitance potential-divider providing for setting of the grid-voltage for the heating electrode voltage pre-chosen by the adjustment of said coupling.

13. In a system comprising an oscillator tube for generating radio-frequency power for dielectrically heating work, the combination of a metallic reentrant cavity having metallic fin structure internally extending from one cavity wall and spaced from the remainder thereof and having internal electrode structure attached to said fin structure in spaced relation to all cavity walls, said fin structure being extensible to vary the capacity of said internal electrode structure to accommodate different work-loads, a loop in the anode circuit of said tube and disposed in the cavity space which encircles said film structure for transfer from said tube to said work of radio-frequency power, and a potential-divider comprising capacitance connected from said cavity-electrode structure to the grid of said tube and capacitance between the grid and cathode of said tube, the inductance of said cavity-fin structure and the capacity of said cavity-electrode structure determining the frequency of the generated power and said capacitance potential-divider automatically regulating the radio-frequency potential of said grid to maintain substantial constancy of the grid-excitation despite substantial variations in power-factor of the work.

14. A dielectric heating applicator comprising an enclosure having conductive walls, a heating electrode disposed within said enclosure substantially parallel to a first of said walls, fin structure electrically connected at its opposite ends respectively to said heating electrode and to a second of said walls, said fin structure being extensible to permit variation in the spacing between said heating electrode and said first wall, said enclosure, electrode and fin structure forming a resonator, and supplemental capacity structure supported by said heating electrode and disposed in spaced relation to said fin structure and to all of said walls to minimize change in the total capacitance of said resonator as said fin structure is extended to vary said spacing.

15. In combination in a dielectric heating apparatus, conductive walls forming a reentrant cavity, electrode structure disposed within said cavity and including an electrode of substantial length and breadth having a face thereof in opposed relation with an adjacent wall of said cavity and substantially parallel thereto, the length and breadth of said electrode being less than the length and breadth of said cavity, conductive structure extending normal to the plane of said electrode and electrically connected at one end to said electrode and at the opposite end to the opposite wall of said cavity to form the inductance of a resonant circuit, other conductive structure extending normal to the plane of said electrode and terminating in plates forming additional capacitors primarily with respect to the wall of the cavity remotely located with respect to said electrode, and means for varying the spacing between said electrode and said adjacent wall of the cavity while simultaneously varying the spacing between said auxiliary plates and said opposite wall to maintain substantially uniform the capacity of said resonant circuit over a wide range of adjustment of said electrode, and means for supplying to said cavity high-frequency electrical energy for development between said electrode and said adjacent wall of a high-voltage, high-frequency electric field.

16. A dielectric heating applicator comprising a metallic reentrant cavity, a heating electrode within said cavity in spaced relation to all walls thereof, and fin structure fixedly attached at its opposite ends to said heating electrode and a wall of said cavity, said fin structure including an extensible section for substantial variation of the spacing between said heating electrode and an opposite wall of the cavity, said metallic cavity, said electrode and said fin structure forming a reentrant cavity resonator.

17. In a dielectric heating system comprising a source for supplying radio-frequency power to a dielectric work-load, a metal reentrant cavity having metallic fin structure internally extending from one cavity wall and spaced from the remainder thereof to form the lumped inductance of said cavity and having internal electrode structure attached to said fin structure in spaced relation to all cavity walls to provide lumped capacitance resonating said lumped inductance, said fin structure having within said cavity a section which is extensible concurrently to change the lumped inductance and capacitance of the cavity upon change in spacing of said electrode structure relative to wall structure of said cavity, a device for applying pressure to work disposed between said electrode structure and wall structure of said cavity, and a loop in the cavity space which encircles said fin structure for inductively coupling said cavity to said source.

18. A dielectric heating applicator comprising sheet metal structure defining a reentrant cavity having conductive walls, metallic fin structure extending from a first of said walls, said fin structure including accordion-folded sheet metal permitting the fin structure to be extended or contracted, an electrode electrically and mechanically connected to the free end of said fin structure and extending normal thereto to provide an area substantially exceeding the area defined by the perimeter of the fin structure, a second electrode electrically connected to or formed by the opposite of said walls, said fin structure forming essentially the total inductance of a high-Q resonant circuit including the capacity between said electrodes, said conductive walls of the cavity serving as a low-reactance, low-resistance circuit element connecting said capacity and inductance in series, and driving means for moving said electrode of the extensible fin structure to and from work between the electrodes to vary the spacing therefrom or the pressure applied thereto.

19. In a system for high-frequency electric heating of dielectric material, a resonant applicator including electrodes supported in spaced relationship for receiving such material therebetween and inductance structure electrically connected at one end to and extending away from one of said electrodes, said applicator also including conductive structure electrically interconnecting the other end of said inductance structure with the other of said electrodes, said conductive structure comprising a shielding housing enclosing said inductance structure and the space between said electrodes, said inductance structure cooperating with capacity-means including said electrodes to provide a resonant circuit, a power oscillator of which said resonant applicator forms a part and including an oscillator tube having effective input capacity which varies with variation in loading between said electrodes, means for deriving from said applicator a potential which varies in accordance with variation in voltage between said electrodes, and a potential-divider upon which said derived potential is impressed, which potential-divider includes capacitance means in series with said effective input capacity and cooperative therewith to provide across said effective input capacity a grid-excitation voltage which varies in compensatory sense with such variation in loading.

20. A resonant dielectric heating applicator comprising electrically conductive wall structure forming an enclosure, capacitance means within said enclosure and at least in part comprising spaced heating electrodes, at least one of which is spaced from said wall structure of said enclosure, inductance means disposed within said enclosure and at least in part comprising inductance structure extending from said one of said electrodes, said inductance structure being extensible to permit variation in the spacing between said heating electrodes, said inductance means and said capacitance means being electrically interconnected by the wall structure of said enclosure, supplemental capacity structure supported by said one of said electrodes and extending therefrom in spaced relation to said inductance structure and to said wall structure to minimize the percentage change in total capacitance of said resonant applicator upon change in the spacing between said heating electrodes, and means for moving said one electrode relative to the other of said electrodes to change said electrode spacing.

21. A dielectric heating applicator comprising structure defining a reentrant cavity having conductive wall structure, metallic fin structure extending from said wall structure, said fin structure having within said cavity an extensible section to permit the fin structure to be extended or contracted, an electrode electrically and mechanically connected to the free end of said fin structure and extending normal thereto to provide an area substantially exceeding the area defined by the perimeter of the fin structure, a second electrode electrically connected to or formed by a portion of the wall structure opposite said first mentioned electrode, said fin structure forming essentially the total inductance of a high-Q resonant circuit including the interelectrode capacity, said conductive wall structure of the cavity serving as a low-reactance, low-resistance circuit element connecting said capacity and inductance in series, and driving means for moving said electrode of the extensible fin structure to and from work between the electrodes to vary the spacing therefrom or the pressure applied thereto.

22. An applicator for high-frequency electric heating of dielectric materials comprising a reentrant cavity resonator having an electrically conductive housing with reentrant structure projecting into the interior thereof, inductance structure within the housing and comprising at least one inductive element projecting into the interior of the housing and constituting at least part of said reentrant structure, spaced electrode structures cooperative to provide electric field space within the housing, one of which electrode structures is disposed at the inwardly projecting end of said inductive element in spaced relation to the wall structure of the housing and electrically connected with the wall structure of the housing through said inductive element, said wall structure providing a low-resistance, low-reactance path completing a resonant circuit which includes said inductance structure and said electrode structures and the frequency of which is predominantly determined by the inductance of said inductance structure and the capacitance between said electrode structures, said housing serving as a shield to confine the electric field produced between said electrode structures and the magnetic field encircling said inductive element, and means including a portion of the wall structure of said housing providing a power transfer coupling loop disposed within the housing in position to be traversed by said magnetic field encircling said inductive element.

23. An applicator as defined in claim 22, wherein said coupling loop is in part formed by a portion of said inductive element which projects into the interior of the housing.

24. In a high-frequency dielectric heating system, a source of high-frequency power having a power-delivery circuit whose frequency is non-harmonically related to the operating frequency of said source, a power-receiving load circuit having inductance and capacitance structures providing a high unloaded Q for said power-receiving circuit and electrically connected predominantly to determine the operating frequency of said source, said power-receiving circuit including electrodes spaced to receive work to be heated, and a power-transfer loop included only in said power-delivery circuit and in magnetic coupling relation to said power-receiving circuit, said loop being dimensioned and disposed to provide supraoptimum mutual inductance coupling between said circuits in avoidance of excessive change in voltage between said electrodes otherwise occurring with variation of the work being heated.

25. The high-frequency heating system of claim 24 in which the load circuit is a reentrant cavity having fin structure forming the load circuit inductance and in which the supraoptimum mutual inductance coupling is afforded by magnetic flux encircling the fin structure and threading said loop.

26. The high-frequency heating system of claim 24 in which the load circuit is a reentrant cavity and said power-transfer loop is a single-turn loop.

27. A high-frequency dielectric heating system as in claim 24 in which said source of high-frequency power includes an oscillator tube and in which a load-compensated grid-excitation voltage for said oscillator tube is derived from said load circuit by a potential-divider, which potential-divider comprises capacitance means connected to the grid of the oscillator tube in series with the substantially larger effective input capacity of said tube, which input capacity increases and decreases automatically in compensatory sense with changes of load between said electrodes.

28. The dielectric heating system of claim 24 in which said source of high-frequency power is an oscillator of the TNT type having its grid excitation applied by way of the anode-grid capacitance to the grid-cathode circuit, said last-named circuit including a grid inductor.

29. The dielectric heating system of claim 24 in which said source of high-frequency power includes an oscillator tube having its grid excitation derived from said power-receiving circuit, and means including said power-receiving circuit for developing a grid excitation voltage which is but a fraction of the voltage developed between said spaced electrodes.

30. The system of claim 29 in which said means includes grid-cathode connections which include a capacitor having a capacitance which is small compared with the effective grid-cathode capacitance of said oscillator.

31. The system of claim 24 in which adjustable structure is provided for varying said mutual inductance coupling within the supraoptimum range.

32. The system of claim 24 in which said power-receiving load circuit comprises a shielding enclosure having conductive wall structure surrounding said inductance and capacitance structures and forming therewith a reentrant resonant applicator, said inductance structure being electrically connected at one end to one of said electrodes and at its opposite end through said wall structure to the other of said electrodes, and said power-transfer loop being disposed in the space traversed by the magnetic field encircling said inductance structure.

33. A resonant high-frequency heating applicator comprising electrically conductive wall structure forming an enclosure, capacitance means within said enclosure and in part comprising spaced heating electrodes, at least one of which is spaced from said wall structure of said enclosure, inductance means disposed within said enclosure and electrically connected between one of said electrodes and said wall structure, the other of said electrodes being connected through said wall structure to said inductance to form therewith a power-receiving heating circuit, and means for adjusting the spacing between said heating electrodes, said capacitance means including supplemental capacity structure having at least one wide metallic element electrically connected along its end to and supported in a position extending away from the face of one of the electrodes which is remote from the other of said heating electrodes and in spaced relation to said wall structure to provide substantial additional capacitance which minimizes the percentage of change in total capacitance of said heating circuit upon change of the capacitance between the heating electrodes with change in their spacing.

34. In a high-frequency dielectric heating system, the combination of a power-receiving circuit comprising a reentrant resonant applicator having conductive wall structure forming an electrically conductive housing and having therein inductance and capacitance structures providing a high unloaded Q, high-frequency power-supply means having a power-delivery circuit, the operating frequency of said power-supply means being primarily determined by said structures of said power-receiving circuit, said inductance and capacitance structures including electrodes of extended area and an inductance element reentrantly projecting into the interior of said housing, one of said electrodes being formed by or electrically connected to adjacent wall structure of said housing and a second of said electrodes being electrically connected to and disposed at the inwardly projecting end of said inductance element in spaced relation to all wall structure of said housing, said electrodes being electrically connected through said inductance element and wall structure of said housing to form said high-Q circuit for heating of a dielectric work load disposed between said electrodes, said power-supply means being characterized by inclusion in said power-delivery circuit of a power-transfer loop formed by at least a substantial length of said inductance element.

35. In a high-frequency dielectric heating system, the combination of a power-receiving circuit comprising a reentrant resonant applicator having wall structure forming an electrically conductive housing and having therein inductance and capacitance structures providing a high unloaded Q, an oscillator having a power-delivery circuit and whose operating frequency is primarily determined by said structures of said power-receiving circuit, said inductance and capacitance structures including electrodes of extended area and an inductance element reentrantly projecting into the interior of said housing, one of said electrodes being formed by or electrically connected to adjacent wall structure of said housing and a second of said electrodes being electrically connected to and disposed at the inwardly projecting end of said inductance element in spaced relation to all wall structure of said housing, said electrodes being electrically connected through said inductance element and wall structure of said housing to form said high-Q circuit for heating of a dielectric work load disposed between said electrodes, said oscillator being characterized by the inclusion in its said power-delivery circuit of a coupling loop having a major portion of its periphery formed by a substantial length of said inductance structure and by a substantial length of said wall structure.

36. The system of claim 35 in which an adjustable connection is provided for changing the ratio of the length of said inductance structure included in said loop with respect to the length of said wall structure included in said loop.

37. The system of claim 35 in which an adjustable connection is provided for changing the ratio of the length of said inductance structure included in said loop with respect to its overall length.

38. In a high-frequency dielectric heating system, the combination of a power-receiving circuit comprising a reentrant cavity resonator having conductive wall structure forming an electrically conductive housing and having therein capacitance and inductance structures respectively including spaced electrodes of extended area for the heating of dielectric work disposed in the electric field between the electrodes and an inductance element reentrantly projecting into the interior of said housing in spaced relation with said wall structure to provide for the magnetic field encircling said inductance element an unobstructed path around and lengthwise thereof, one of said electrodes being formed by or electrically connected to adjacent wall structure of said housing, a second of said electrodes being disposed at, electrically connected to, and extending outwardly from, the inwardly projecting end of said inductance element in spaced relation to all wall structure of said housing and being electrically connected with said wall structure through said inductance element, and means including at least portions of said wall structure electrically interconnecting said capacitance and inductance structures to complete said power-receiving circuit and affording a high unloaded Q thereof; high-frequency power-supply means having a power-delivery circuit and excitation means energized from said power-receiving circuit so that the operating frequency of the system is primarily determined by said capacitance and inductance structures included in said power-receiving circuit; and a power-transfer loop included in said power-delivery circuit and disposed within said unobstructed path of said magnetic field encircling said inductance element in a position intermediate said outwardly extending electrode and said wall structure to which said inductance element is electrically connected to provide a loop area for traverse therethrough of a substantial portion of the magnetic field which encircles the inductance element in the region of the loop intermediate the ends of said inductance element to provide mutual inductance coupling between said power-delivery circuit and said power-receiving circuit, variation of said mutual inductance coupling varying the voltage applied to work disposed between said electrodes.

39. The heating system of claim 38 in which said housing is elongated, in which at least one electrode is elongated in the direction of elongation of said housing, and in which opposite wall structure of said housing has partially open sides to afford a continuation of the space between the electrodes in the direction of elongation of said housing.

40. The heating system of claim 39 in which a conveyor extends through said partially-open opposite wall structure of said housing to transport the work in a path which is between said electrodes and which is exclusive of the space traversed by the high-frequency magnetic field of said inductance element.

41. In a high-frequency dielectric heating system, the combination of a power-receiving circuit comprising a reentrant cavity resonator having conductive wall structure forming an electrically conductive housing and having therein capacitance and inductance structures respectively including spaced electrodes of extended area for the heating of dielectric work disposed in the electric field between the electrodes and an inductance element reentrantly projecting into the interior of said housing in spaced relation with said wall structure to provide for the magnetic field encircling said inductance element an unobstructed path around and lengthwise thereof, one of said electrodes being formed by or electrically connected to adjacent wall structure of said housing, a second of said electrodes being electrically connected to and disposed at the inwardly projecting end of said inductance element in spaced relation to all wall structure of said housing and being electrically connected with said wall structure through said inductance element, and means including at least portions of said wall structure electrically interconnecting said capacitance and inductance structures to complete said power-receiving circuit and affording a high unloaded Q thereof; high-frequency power-supply means having a power-delivery circuit and excitation means energized from said power-receiving circuit so that the operating frequency of the system is primarily determined by said capacitance and inductance structures included in said power-receiving circuit; and a power-transfer loop included in said power-delivery circuit and disposed within said unobstructed path of said magnetic field encircling said inductance element to provide mutual inductance coupling between said power-delivery circuit and said power-receiving circuit, said loop being poled to produce for said excitation means a voltage of phase which maintains generation of oscillations at said system frequency, whereby variation of said mutual inductance coupling varies the voltage applied to work between said electrodes.

42. In a high-frequency dielectric heating system, the combination of a power-receiving circuit comprising a reentrant cavity resonator having conductive wall structure forming an electrically conductive housing and having therein capacitance and inductance structures respectively including spaced electrodes of extended area for the heating of dielectric work disposed in the electric field between the electrodes and an inductance element reentrantly projecting into the interior of said housing in spaced relation with said wall structure to provide for the magnetic field encircling said inductance element an unobstructed path around and lengthwise thereof, one of said electrodes being formed by or electrically connected to adjacent wall structure of said housing, a second of said electrodes being disposed at, electrically connected to, and extending outwardly from, the inwardly projecting end of said inductance element in spaced relation to all wall structure of said housing and being electrically connected with said wall structure through said inductance element, and means including at least portions of said wall structure electrically interconnecting said capacitance and inductance structures to complete said power-receiving circuit and affording a high unloaded Q thereof; high-frequency power-supply means having a power-delivery circuit and excitation means energized from said power-receiving circuit so that the operating frequency of the system is primarily determined by said capacitance and inductance structures included in said power-receiving circuit; and a power-transfer loop included in said power-delivery circuit and disposed within said unobstructed path of said magnetic field encircling said inductance element in a position intermediate said outwardly extending electrode and said wall structure to which said inductance element is electrically connected to provide a loop area for traverse therethrough of a substantial portion of the magnetic field which encircles the inductance element in the region of the loop intermediate the ends of said inductance element to provide mutual inductance coupling between said power-delivery circuit and said power-receiving circuit, variation of said mutual inductance coupling varying the voltage applied to work disposed between said electrodes, said loop being poled to produce for said excitation means a voltage of phase which maintains generation of oscillations at said system frequency, said reentrant resonator in a region beyond the projecting end of said inductance element having partially open wall structure in alignment with the space between said electrodes for passage of work into and out of said space.

43. In a high-frequency dielectric heating system, the combination of a power-receiving circuit comprising a reentrant cavity resonator having conductive wall structure forming an electrically conductive housing and having therein capacitance and inductance structures respectively including spaced electrodes of extended area for the heating of dielectric work disposed in the electric field between the electrodes and an inductance element reentrantly projecting into the interior of said housing in spaced relation with said wall structure to provide for the magnetic field encircling said inductance element an unobstructed path around and lengthwise thereof, one of said electrodes being formed by or electrically connected to adjacent wall structure of said housing, a second of said electrodes being disposed at, electrically connected to, and extending outwardly from the inwardly projecting end of said inductance element in spaced relation to all wall structure of said housing and being electrically connected with said wall structure through said inductance element, and means including at least portions of said wall structure electrically interconnecting said capacitance and inductance structures to complete said power-receiving circuit and affording a high unloaded Q thereof; high-frequency power-supply means having a power-delivery circuit and excitation means energized from said power-receiving circuit so that the operating frequency of the system is primarily determined by said capacitance and inductance structures included in said power-receiving circuit; and a power-transfer loop included in said power-delivery circuit and disposed within said unobstructed path of said magnetic field encircling said inductance element in a position intermediate said outwardly extending electrode and said wall structure to which said inductance element is electrically connected to provide a loop area for traverse therethrough of a substantial portion of the magnetic field which encircles the inductance element in the region of the loop intermediate the ends of said inductance element to provide mutual inductance coupling between said power-delivery circuit and said power-receiving circuit, variation of said mutual inductance coupling varying the voltage applied to work disposed between said electrodes, said loop having one terminal-end insulated from and extending through said wall structure disposed in opposed relation to said inductance element and the other terminal-end electrically connected to said wall structure, said loop being poled to produce for said excitation means a voltage of phase which maintains generation of oscillations at said system frequency, said reentrant resonator in a region beyond the projecting end of said inductance element having partially open wall structure in alignment with the space between said electrodes for passage of work into and out of said space.

44. In a high-frequency dielectric heating system, the combination of a power-receiving circuit comprising a reentrant cavity resonator having conductive wall structure forming an electrically conductive housing and having therein capacitance and inductance structures respectively including spaced electrodes of extended area for the heating of dielectric work disposed in the electric field between the electrodes and an inductance element reentrantly projecting into the interior of said housing in spaced relation with said wall structure to provide for the magnetic field encircling said inductance element an unobstructed path around and lengthwise thereof, one of said electrodes being formed by or electrically connected to adjacent wall structure of said housing, a secend of said electrodes being electrically connected to and disposed at the inwardly projecting end of said inductance element in spaced relation to all wall structure of said housing and being electrically connected with said wall structure through said inductance element, and means including at least portions of said wall structure electrically interconnecting said capacitance and inductance structures to complete said power-receiving circuit and affording a high unloaded Q thereof; high-frequency power-supply means having a power-delivery circuit and excitation means energized from said power-receiving circuit so that the operating frequency of the system is primarily determined by said capacitance and inductance structures included in said power-receiving circuit; and a power-transfer loop included in said power-delivery circuit and disposed within said unobstructed path of said magnetic field encircling said inductance element to provide mutual inductance coupling between said power-delivery circuit and said power-receiving circuit, said loop having one side at least in part formed by wall structure extending in direction lengthwise of said inductance element, opposite sides of said loop extending in direction away from said last-named wall structure toward said inductance element for traverse through said loop of a large part of said magnetic field which encircles said inductance element in the region of said loop between said last-named wall structure and said inductance element, said loop having one terminal-end insulated from and extending through said last-named wall structure and the other terminal-end electrically connected to said wall structure, said loop being long lengthwise of said inductance element and also having a width for traverse through the loop of the large part of said magnetic field which throughout the length of said loop encircles said inductance element, said loop being poled to produce for said excitation means a voltage of phase which maintains generation of oscillations at said system frequency, variation of said mutual inductance coupling varying the voltage applied to work disposed between said electrodes, said reentrant resonator in a region beyond the projecting end of said inductance element having partially open wall structure to provide a passage in alignment with the space between said electrodes for passage of work into said space, and means for adjusting said mutual inductance coupling to vary the voltage applied to work between said electrodes while maintaining sustained said high-frequency oscillations throughout the range of adjustment of said mutual inductance coupling.

References Cited in the file of this patent

UNITED STATES PATENTS

| | | |
|---|---|---|
| 1,145,366 | Herrold | July 6, 1915 |
| 2,059,299 | Yolles | Nov. 3, 1936 |
| 2,107,387 | Potter | Feb. 8, 1938 |
| 2,197,124 | Conklin | Apr. 16, 1940 |
| 2,204,617 | Peel et al. | June 18, 1940 |
| 2,215,582 | Goldstine | Sept. 24, 1940 |
| 2,218,223 | Usselman et al. | Oct. 15, 1940 |
| 2,308,043 | Bierwirth | Jan. 12, 1943 |
| 2,342,897 | Goldstine | Feb. 29, 1944 |
| 2,352,455 | Summerhayes | June 27, 1944 |
| 2,364,526 | Hansell | Dec. 5, 1944 |
| 2,370,161 | Hansen | Feb. 27, 1945 |
| 2,410,222 | Lawrence | Oct. 29, 1946 |
| 2,446,032 | Watts et al. | July 27, 1948 |
| 2,465,102 | Joy | Mar. 22, 1949 |
| 2,474,420 | Himmel | June 28, 1949 |
| 2,483,569 | Baker | Oct. 4, 1949 |
| 2,488,545 | Lader | Nov. 22, 1949 |
| 2,497,670 | Hanson et al. | Feb. 14, 1950 |
| 2,498,719 | Spencer | Feb. 28, 1950 |
| 2,498,720 | Wild et al. | Feb. 28, 1950 |
| 2,500,752 | Hanson et al. | Mar. 14, 1950 |
| 2,504,109 | Dakin et al. | Apr. 18, 1950 |
| 2,540,613 | Foley et al. | Feb. 6, 1951 |
| 2,546,004 | Kinn | Mar. 20, 1951 |

FOREIGN PATENTS

| | | |
|---|---|---|
| 580,374 | Great Britain | Sept. 5, 1946 |

OTHER REFERENCES

Marcum et al.: "Heating With Microwaves," Electronics, March 1947, pages 82–85.

"Magnetron Adapted to Cooking Purposes," Electrical Engineering, December 1946, page 591.

UNITED STATES PATENT OFFICE

CERTIFICATE OF CORRECTION

Patent No. 2,783,344 February 26, 1957

Henry R. Warren

It is hereby certified that error appears in the printed specification of the above numbered patent requiring correction and that the said Letters Patent should read as corrected below.

Column 12, line 42, for "tunned" read -- tunnel --; column 13, line 13, for "oscillation" read -- oscillations --; column 18, line 39, for "tune" read -- tube --; column 27, line 49, for "film" read -- fin --.

Signed and sealed this 22nd day of October 1957.

(SEAL)
Attest:

KARL H. AXLINE
Attesting Officer

ROBERT C. WATSON
Commissioner of Patents